US008293093B2

(12) United States Patent
Fabian et al.

(10) Patent No.: US 8,293,093 B2
(45) Date of Patent: Oct. 23, 2012

(54) PROCESS FOR COOPER ELECTROWINNING AND ELECTROREFINING

(75) Inventors: Cesimiro Paulino Fabian, Annandale (AU); Thomas William Lancaster, Doonan (AU); Natalie Lancaster, legal representative, Noosa Heads (AU)

(73) Assignee: James Cook University, Townsville (AU)

( * ) Notice: Subject to any disclaimer, the term of this patent is extended or adjusted under 35 U.S.C. 154(b) by 938 days.

(21) Appl. No.: 11/661,001

(22) PCT Filed: Aug. 23, 2005

(86) PCT No.: PCT/AU2005/001262
§ 371 (c)(1),
(2), (4) Date: Nov. 17, 2008

(87) PCT Pub. No.: WO2006/021031
PCT Pub. Date: Mar. 2, 2006

(65) Prior Publication Data
US 2010/0028198 A1   Feb. 4, 2010

(30) Foreign Application Priority Data

Aug. 23, 2004  (AU) ................................ 2004904794

(51) Int. Cl.
*C25C 5/00* (2006.01)
*C25C 1/00* (2006.01)
(52) U.S. Cl. ........................... 205/585; 205/80; 205/414
(58) Field of Classification Search .................. 205/585, 205/80, 414
See application file for complete search history.

(56) References Cited

U.S. PATENT DOCUMENTS

| 2,798,040 | A |   | 7/1957 | Pye et al. |
| 4,085,045 | A | * | 4/1978 | Song et al. ..................... 210/701 |
| 4,948,474 | A | * | 8/1990 | Miljkovic ..................... 205/297 |
| 5,733,429 | A |   | 3/1998 | Martin et al. |
| 6,183,622 | B1 |   | 2/2001 | Janik |
| 6,284,121 | B1 |   | 9/2001 | Reid |

FOREIGN PATENT DOCUMENTS

| JP | 50120419 | 9/1975 |
| JP | 81011756 | 3/1981 |
| JP | 56090993 | 7/1981 |
| JP | 04-120290 | 4/1992 |
| JP | 05-230687 | 9/1993 |

OTHER PUBLICATIONS

International Search Report (Oct. 24, 2005; 2 pages).

(Continued)

*Primary Examiner* — Harry D Wilkins, III
*Assistant Examiner* — Zulmariam Mendez
(74) *Attorney, Agent, or Firm* — Meyertons, Hood, Kivlin, Kowert & Goetzel, P.C.; Eric B. Meyertons

(57) ABSTRACT

A method of electrowinning or electrorefining copper from a copper electrolyte solution which contains chloride ions, the method comprising the steps of: (a) forming a polyacrylamide solution by dissolving polyacrylamide, having a molecular weight range of 5,000 to 20,000,000 Daltons, in an acidic medium and under conditions to form a polyacrylamide block copolymer having blocks of carboxyl groups dispersed along the polymer backbone; (b) introducing the polyacrylamide solution into an electrolytic cell containing the copper electrolyte solution at a polyacrylamide concentration of 0.01-10 mg/L; and (c) electroplating copper from the copper electrolyte solution to form a copper cathode.

14 Claims, 14 Drawing Sheets

OTHER PUBLICATIONS

Chia et al.; Copper Rod and Cathode Quality as Affected by Hydrogen and Organic Additives; Wire Journal International; Nov. 1992.

Vereecken et al.; Influence of Polyacrylamides on the Quality of Copper Deposits from Acidic Copper Sulphate Solutions; Surface Technology 1976; 4; pp. 227-235.

Barkey et al; Roughness Development in Metal Electrodeposition; J. Electrochem, Soc. 1989; 136(8); pp. 2199-2207.

Wang, et al.; Reappearance of Azimuthal Waves in Turbulent Taylor-Couette Flow at Large Aspect Ratio; Chemical Engineering Science; 60; 2005; pp. 5555-5568.

Gabe, Dr. David R.; Rotating Electrodes for Use in Electrodeposition Process Control; Sep. 1995; pp. 69-76.

Price et al.; Physico-Chemical Properties of Copper Electrorefining and Electrowinning Electrolytes; Metallurgical & Materials Transactions B—Process Metallurgy & Materials Processing Science; 1981; 12B; pp. 639-643.

Arvia et al.; Mass Transfer in the Electrolysis of $CuSO_4$—$H_2SO_4$ in Aqueous Solutions under Limiting Current and Forced Convection Employing a Cylindrical Cell with Rotating Electrodes; Electrochimica Acta; 1962; 7; pp. 65-78.

Panzer et al.; Blockiness in Hydrolyzed Polyacrylamide; Proc. Eng. Found. Conf. 1989; pp. 239-249.

Morad-Araghi et al.; Role of Imidization in Thermal Hydrolysis of Polyacrylamides; Water-Soluble Polym Pet. Recovery, [Proc. Nall. Meet. ACS] 1988; pp. 271-278.

Halverson et al.; Sequence Distribution of Carboxyl Groups in Hydrolyzed Polyacrylamide; Macromolecules 1985; 18(6); pp. 1139-1144.

Grchev et al.; Adsorption of Polyacrylamide on Gold and Iron from Acidic Aqueous Solutions; Electrochimica Acta 1991; 36(8); pp. 1315-1323.

Drzymala et al.; Adsorption of Polyacrylamlide, Partially Hydrolyzed Polyacrylamide and Polyacrylic Acid on Ferric Oxide and Silica; Process Technology Proceedings 1987; Flocculation Biotechnol; Sep.Syst; pp. 45-60.

Pefferkorn E.; Polyacrylamide at Solid/Liguid Interfaces; Journal of Colloid & Interface Science; 1999; 216; pp. 197-220.

Caulfield et al.; Some Aspects of the Properties and Degradation of Polyacrylamides; Chemical Reviews; 2002; 102(9); pp. 3067-3083.

Chibowski et al.; Study of Electrokinetic Properties and Structure of Adsorbed Layers of Polyacrylic Acid and Polyacrylamide at $Fe_2O_3$-Polymer Solution Interface; Colloids and Surfaces A: Physicochemical and Engineering Aspects 2002; 208(1-3); pp. 131-145.

Hiskey et al.; Morphological and XRD Characterization of Kupferglirnmer in Copper Anode Slimes; In: Dutrizac J.E.,Clement CG, editors. Copper 2003—Cobre 2003 Copper Electrorefining and Electrowinning; 2003; Santiago, Chile; Canadian Institute of Mining, Metallurgy and Petroleum; 2003; pp. 309-324.

Chen et al.; The Mineralogical Characterization of Tellurium in Copper Anodes; Metallurgical Transaction B; 24B; Dec. 1993; pp. 997-1007.

Kelly, James John; Copper Deposition in the Presence of Mixed Surfactants; PhD Thesis; Columbia University; 1999.

Jovic et al.; Copper Electrodeposition From a Copper Acid Baths in the Presence of PEG and NaCl; J. Serb. Chem. Soc.; 2001; 66; 11-12; pp. 935-952.

Nava-M De Oca et al.; Effectiveness Factors in an Electrochemical Reactor with Rotating Cylinder Electrode for the Acid-Cupric/Copper Cathode Interface Process; Chemical Engineering Science; 2001; 56; 8; pp. 2695-2702.

* cited by examiner

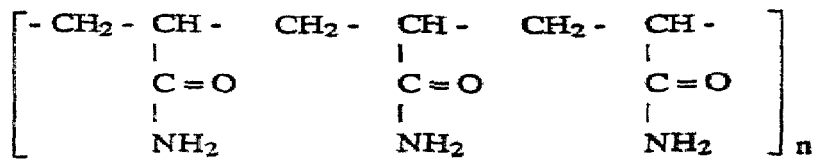
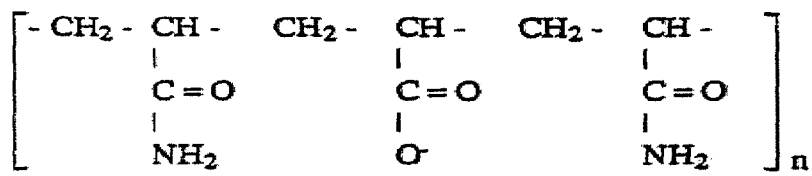
FIG. 1: Neutral or Nonionic polyacrylamide (top) and Anionic or Hydrolyzed polyacrylamide (bottom)
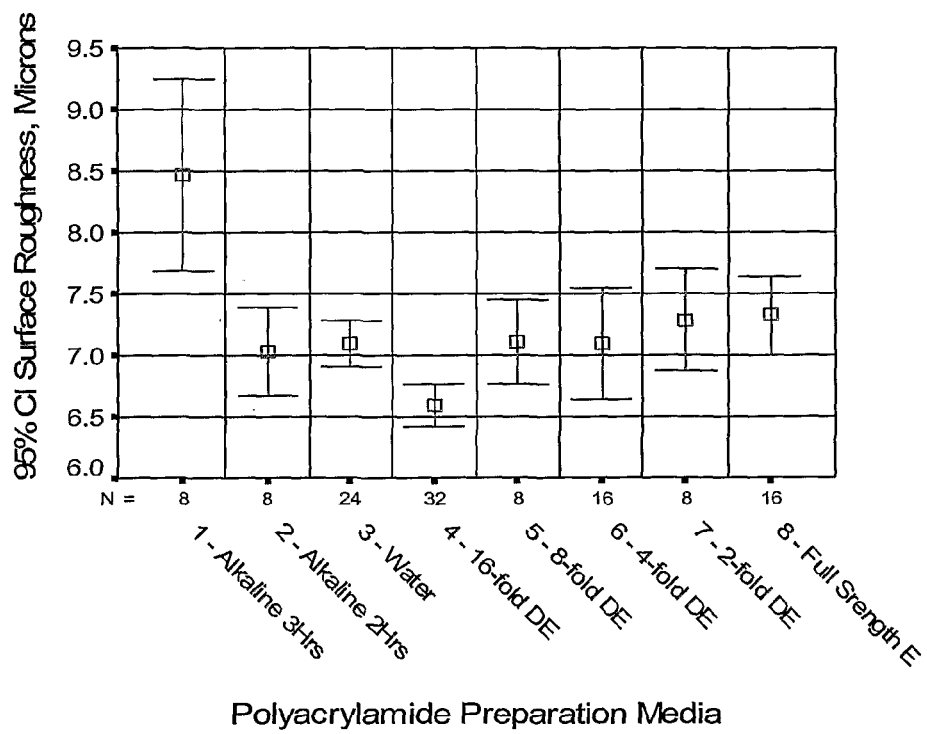
FIG 2: Effect of Preparation Media of Polyacrylamide on Surface Roughness of Copper Cathode.

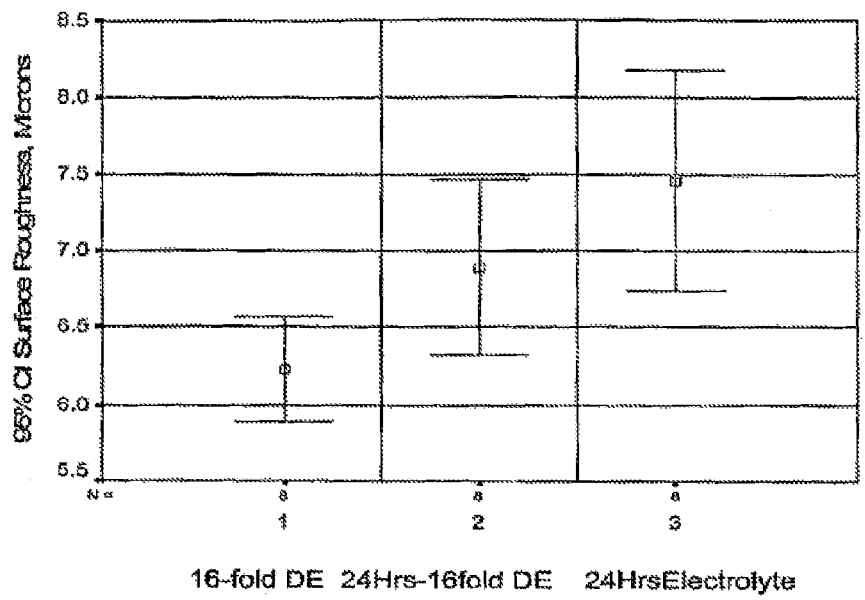
FIG 3: Ageing of Activated Polyacrylamide in 16-Fold Diluted Electrolyte and in Full-Strength Electrolyte
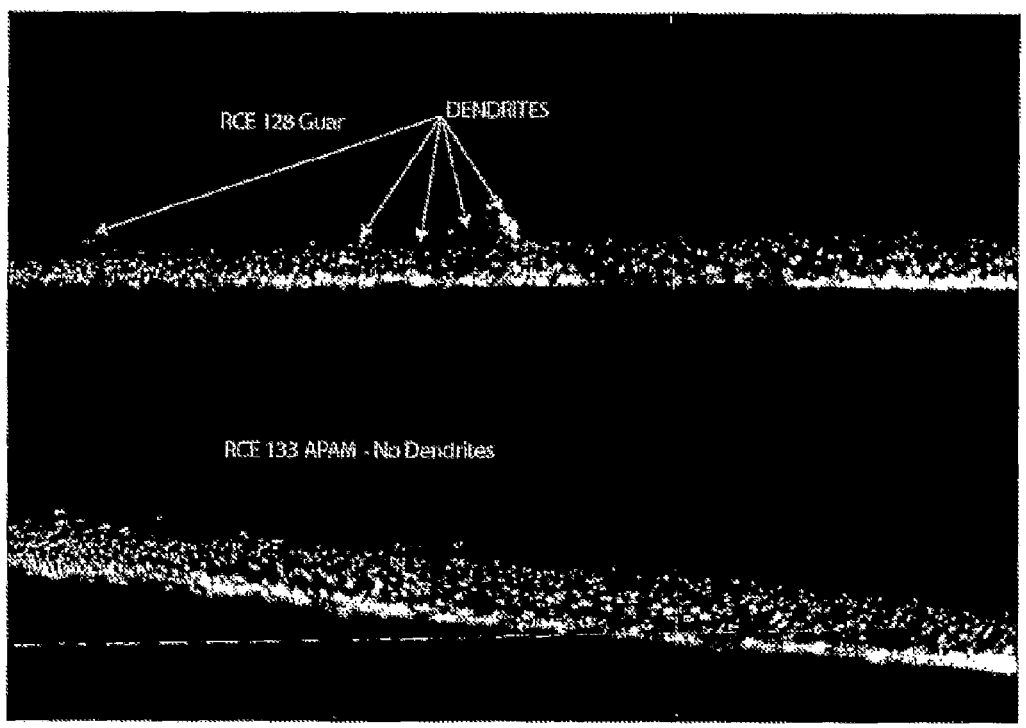
FIG. 4: Comparison of the Copper Cathodes Produced with APAM and Guar after 12 hours Continuous Electrowinning Time.

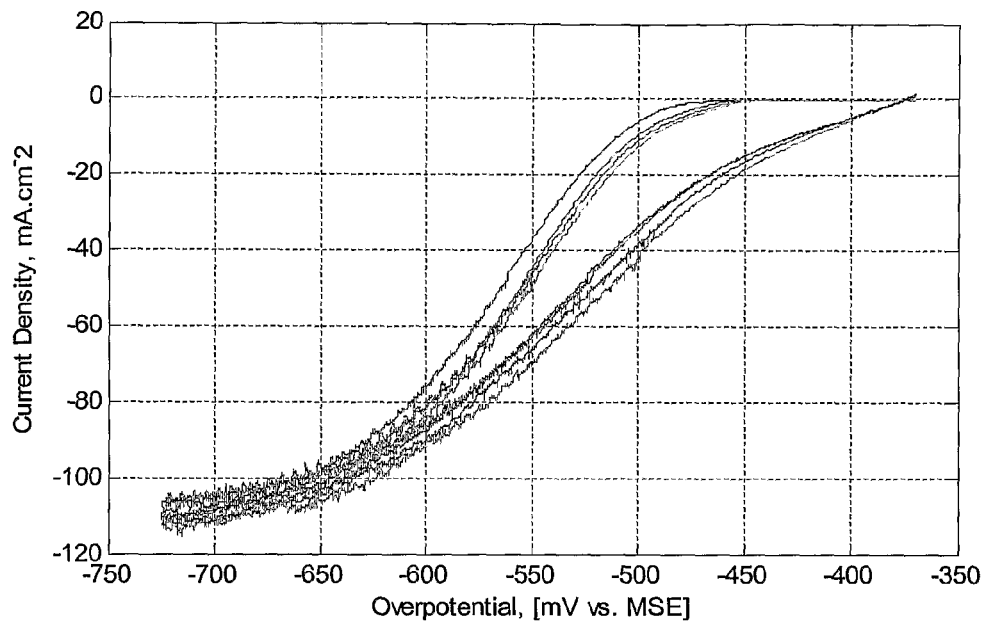
FIG 5: Effect of Guar Residence Time on De-Polarization at 45°C. Left-Set of Curves on Stainless Steel and Right-Set of Curves on Pre-plated Copper; Control (Without Guar) - Black; 0.3 and 1 Hr - Blue; 2 and 3 Hrs. - Red; and 4 and 5 Hrs- Green.
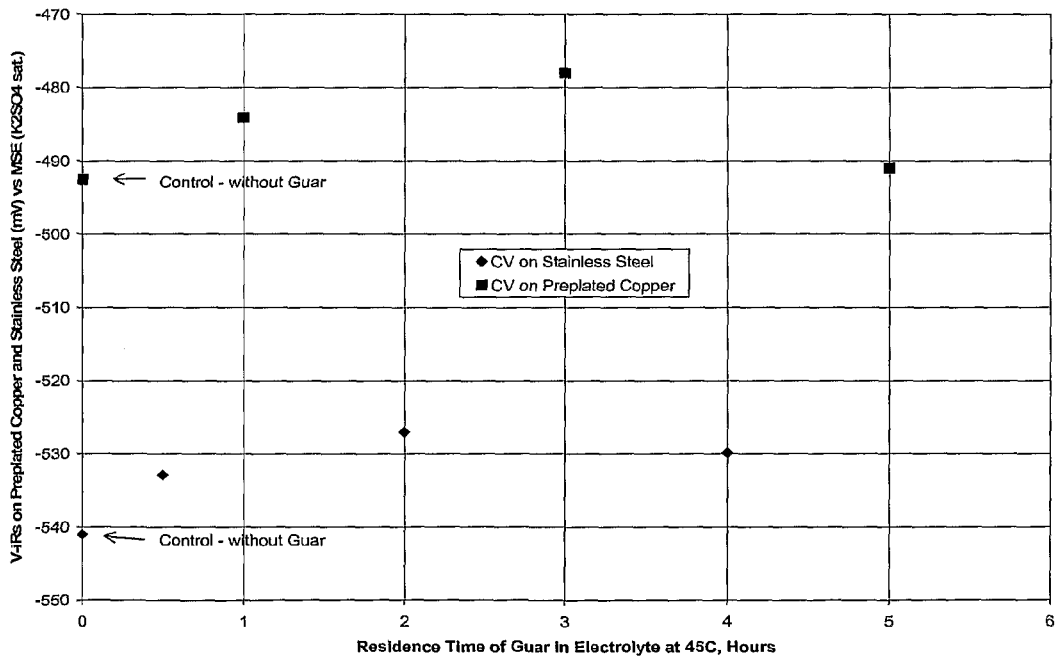
FIG 6: De-polarization Behaviour of the Electrode in the Presence of Guar at 45°C and 300 and 400 A/m$^2$

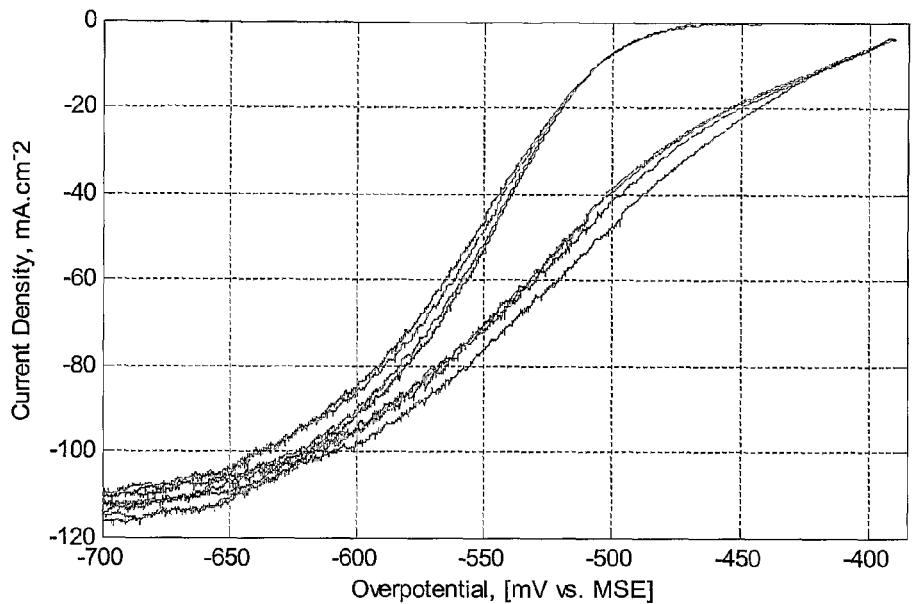
FIG 7: Effect of APAM Residence Time on Polarization at 45°C. Left-Set of Curves on Stainless Steel and Right-Set of Curves on Pre-plated Copper: Control (without APAM) - Black; 0.3 and 1 Hr - Blue; 2 and 3 Hrs. - Red; and 4 and 5 Hrs- Green.
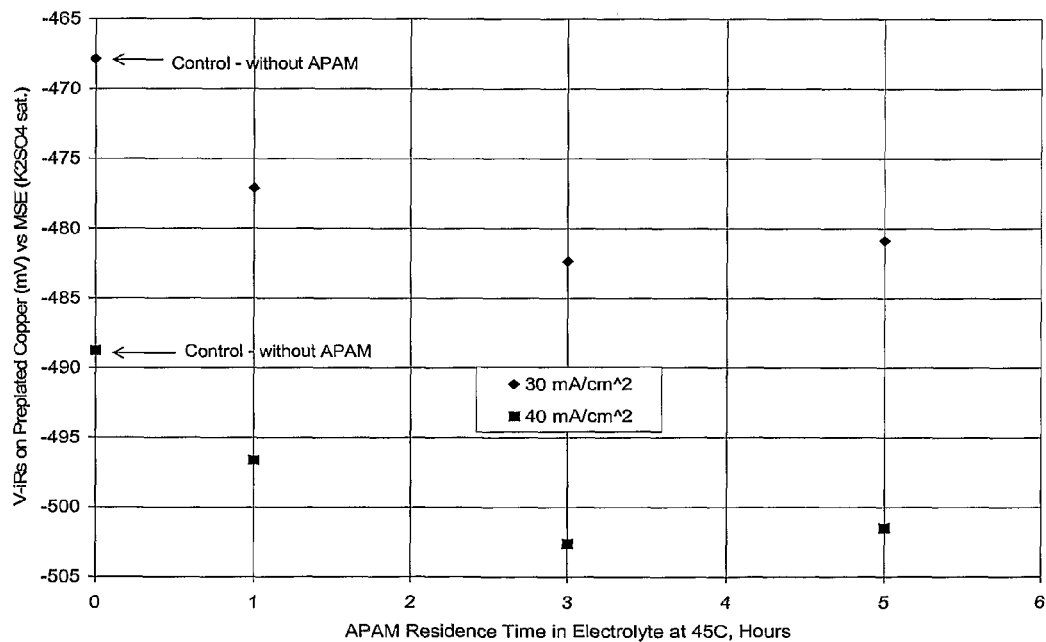
FIG 8: Polarization Behaviour of APAM on Pre-plated Copper at 45°C

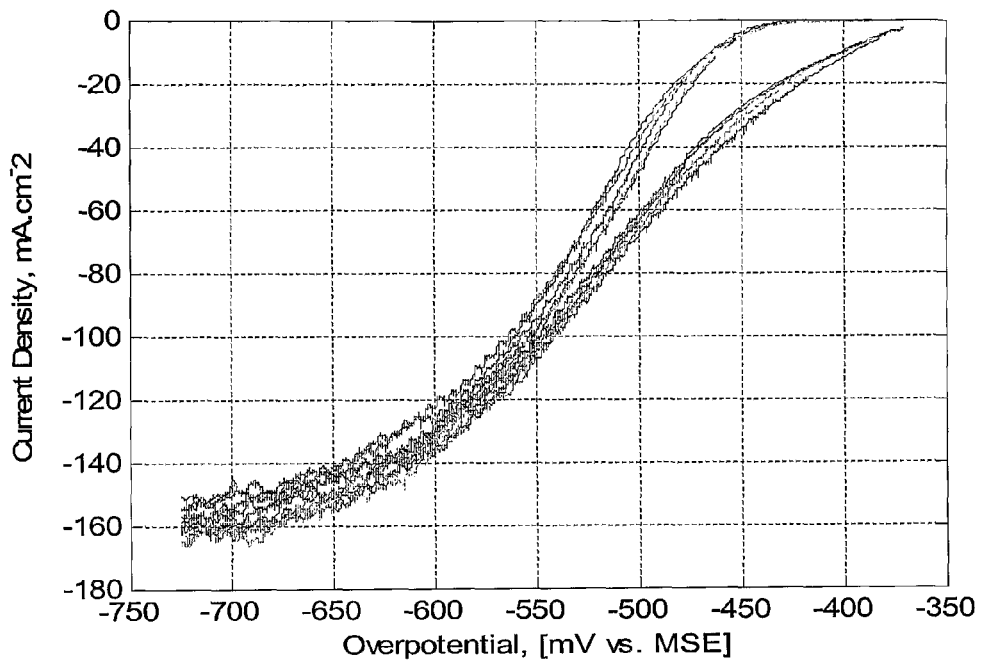
FIG 9: Effect of APAM Residence Time on Polarization at 65°C and 10rpm. Left Set of Curves on Stainless Steel and Right Set of Curves on Pre-plated Copper: Control (Without APAM) - Black; 0.3 and 1 Hr - Blue; 2 and 3 Hrs. - Red; 4 and 5 Hrs. - Green; 6 and 7 Hrs. - Grey.
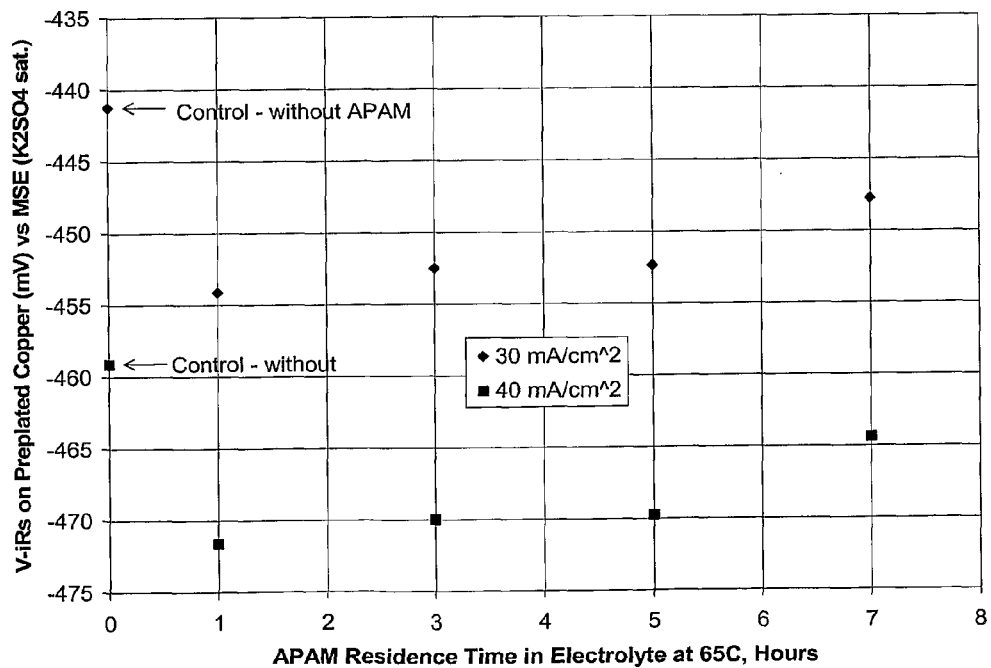
FIG 10: Polarization Behaviour of APAM on Pre-plated Copper at 65°C

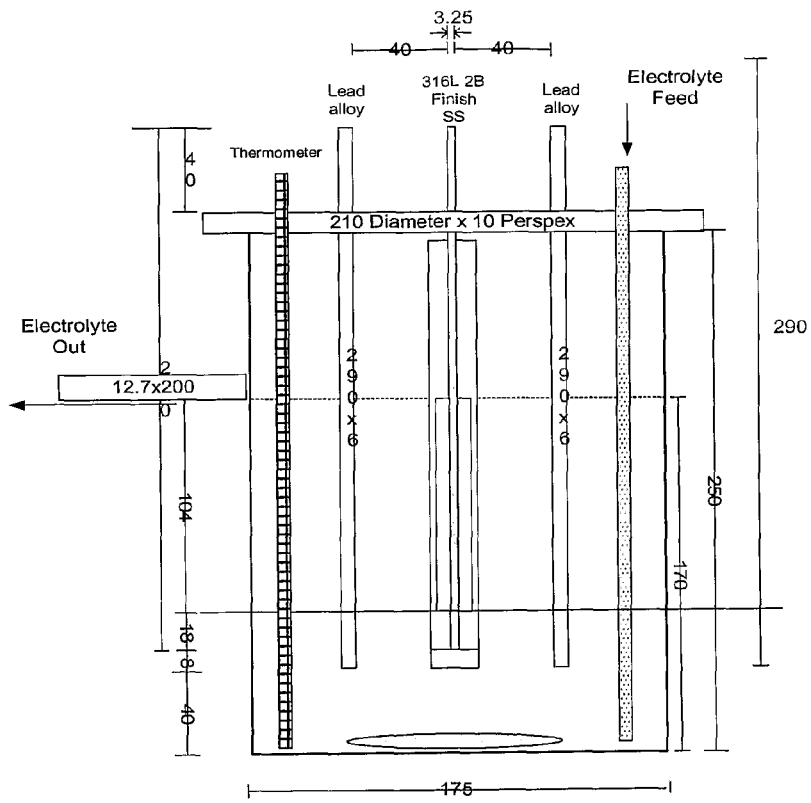
FIG 11 : EW cell design - parallel plate electrodes
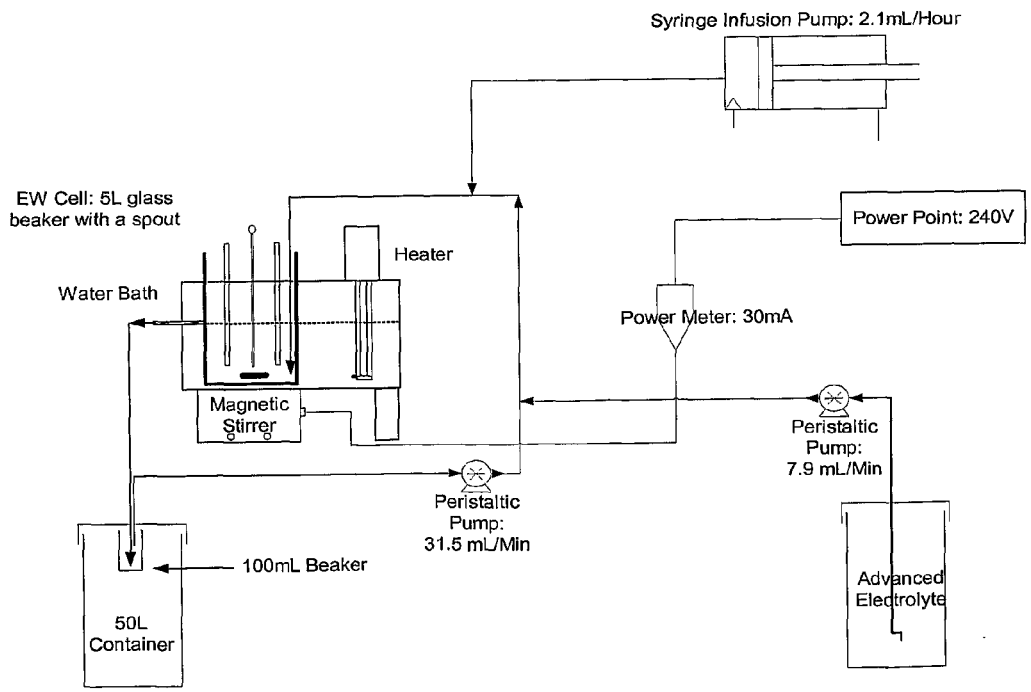
FIG 12 : Bench Scale - Process Design

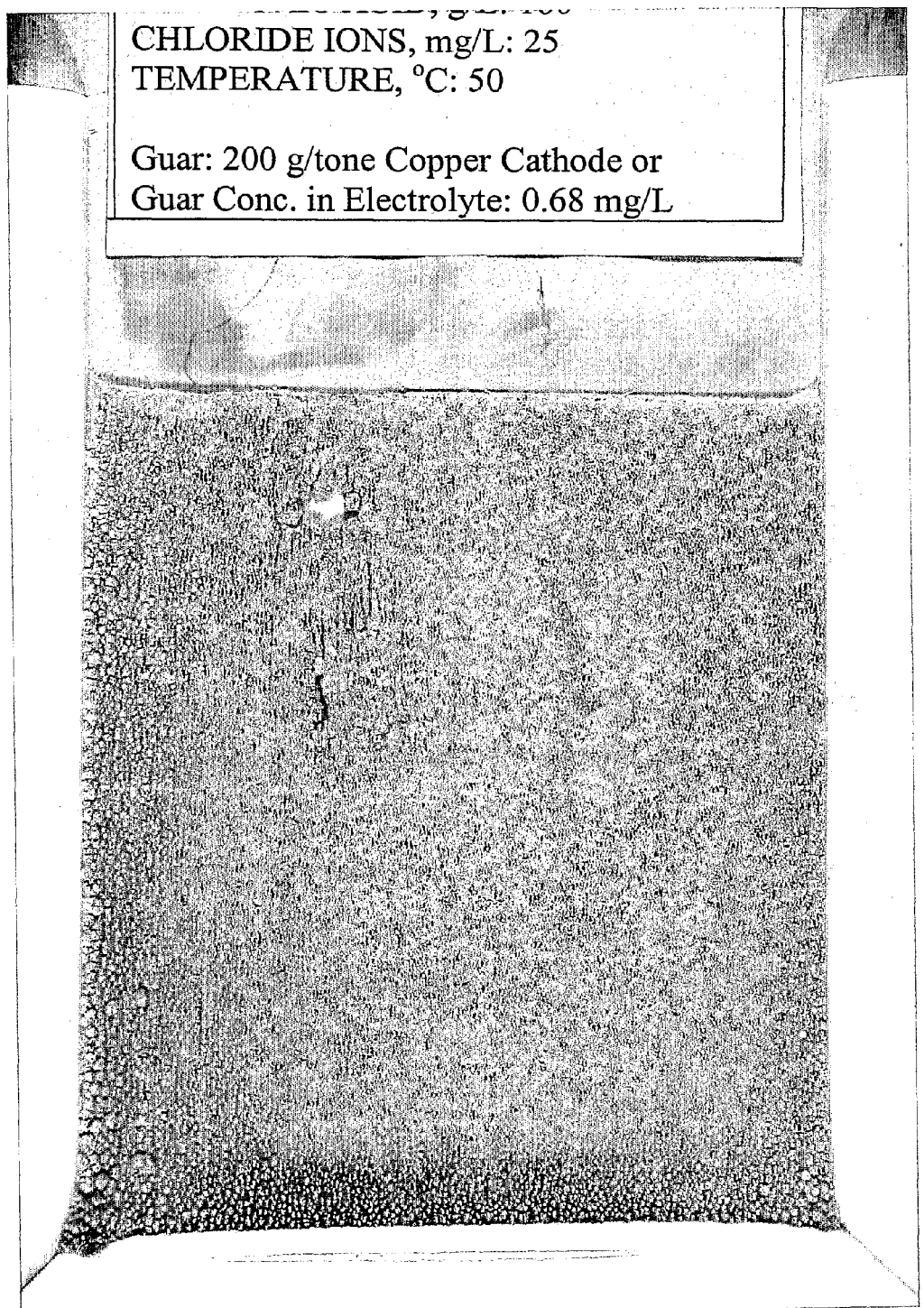
FIG 13: Copper Cathode Produced with Guar (1st face)

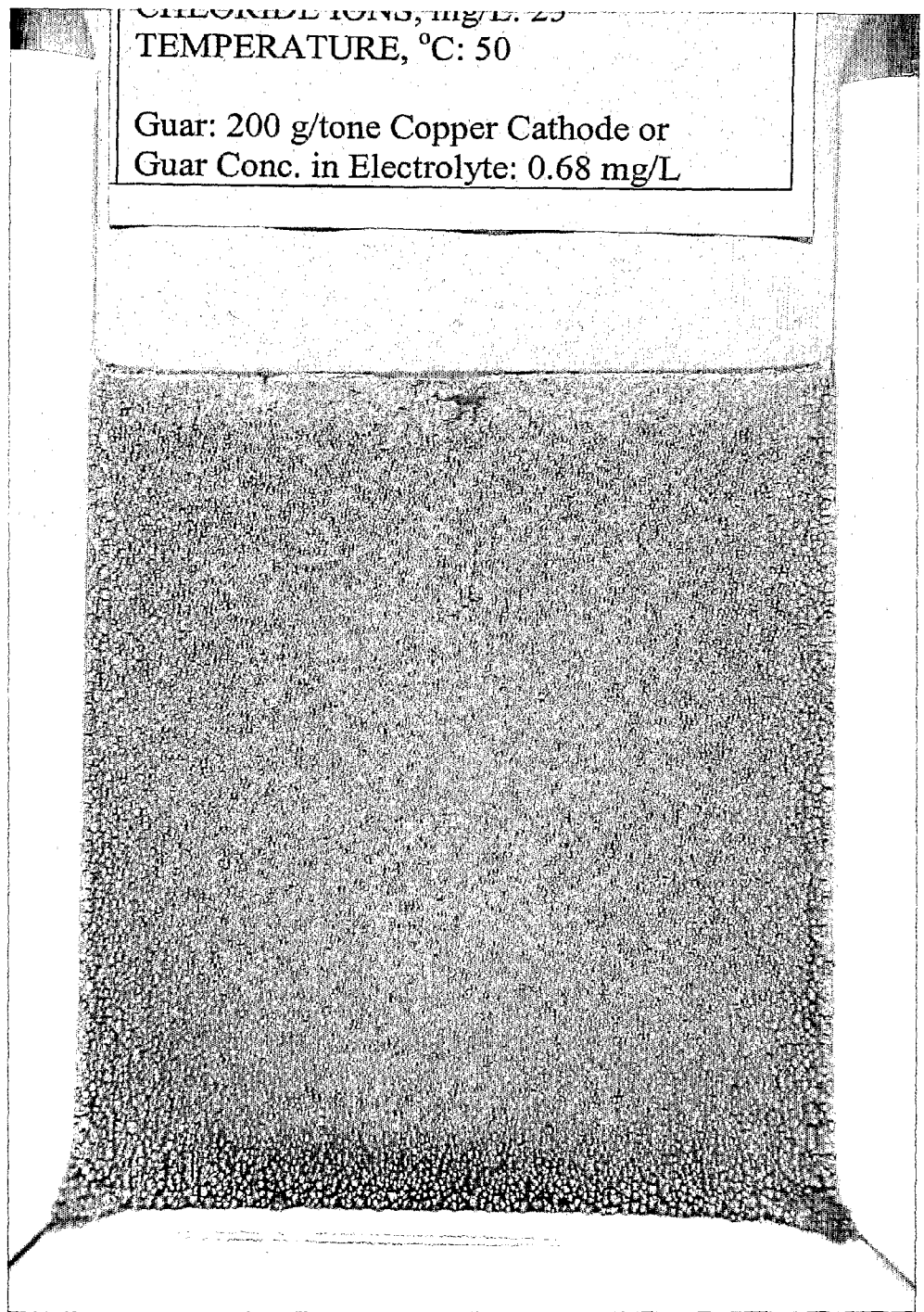
FIG 14: Copper Cathode Produced with Guar (2nd face)

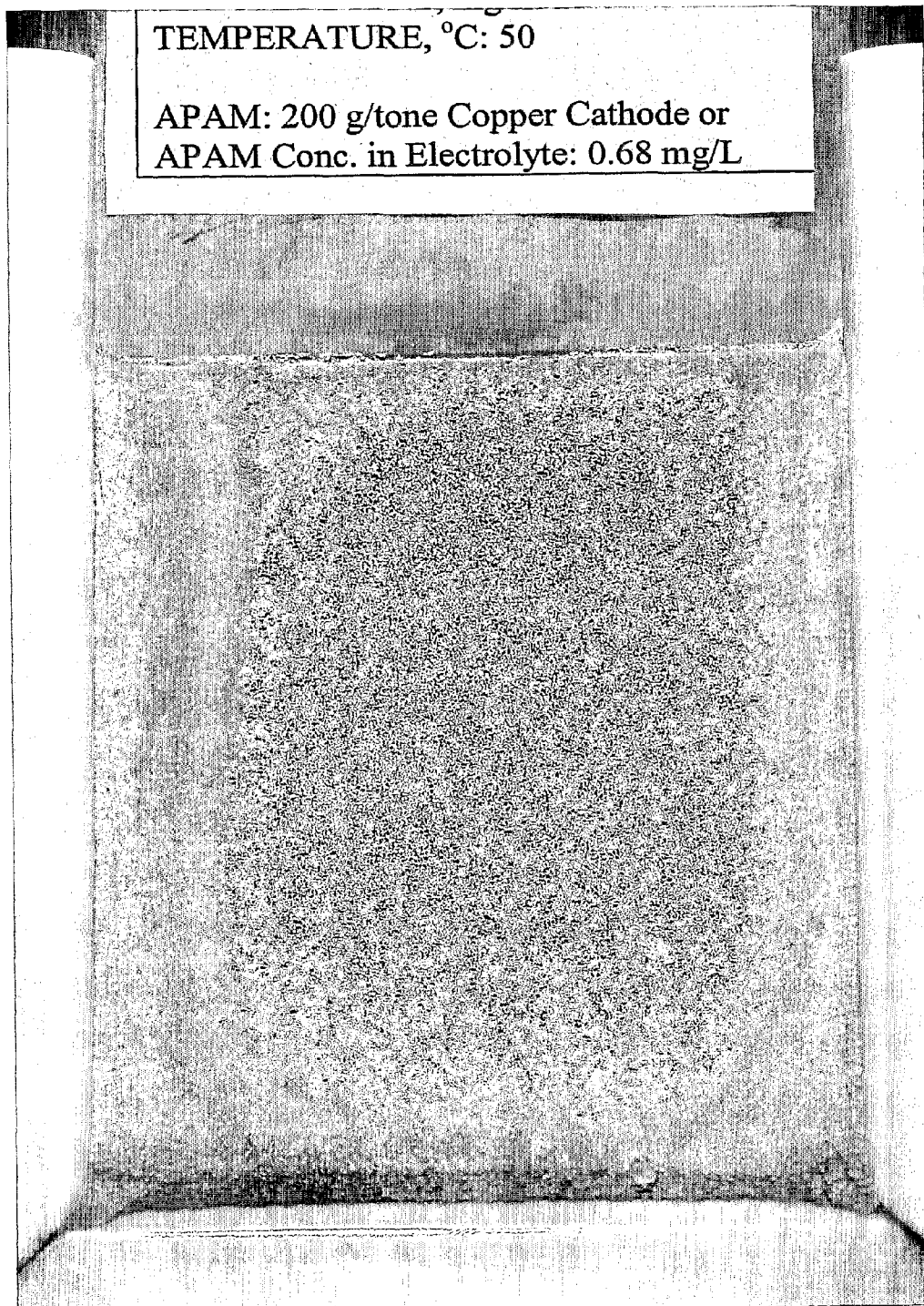
FIG 15: Copper Cathode Produced with APAM (1st face)

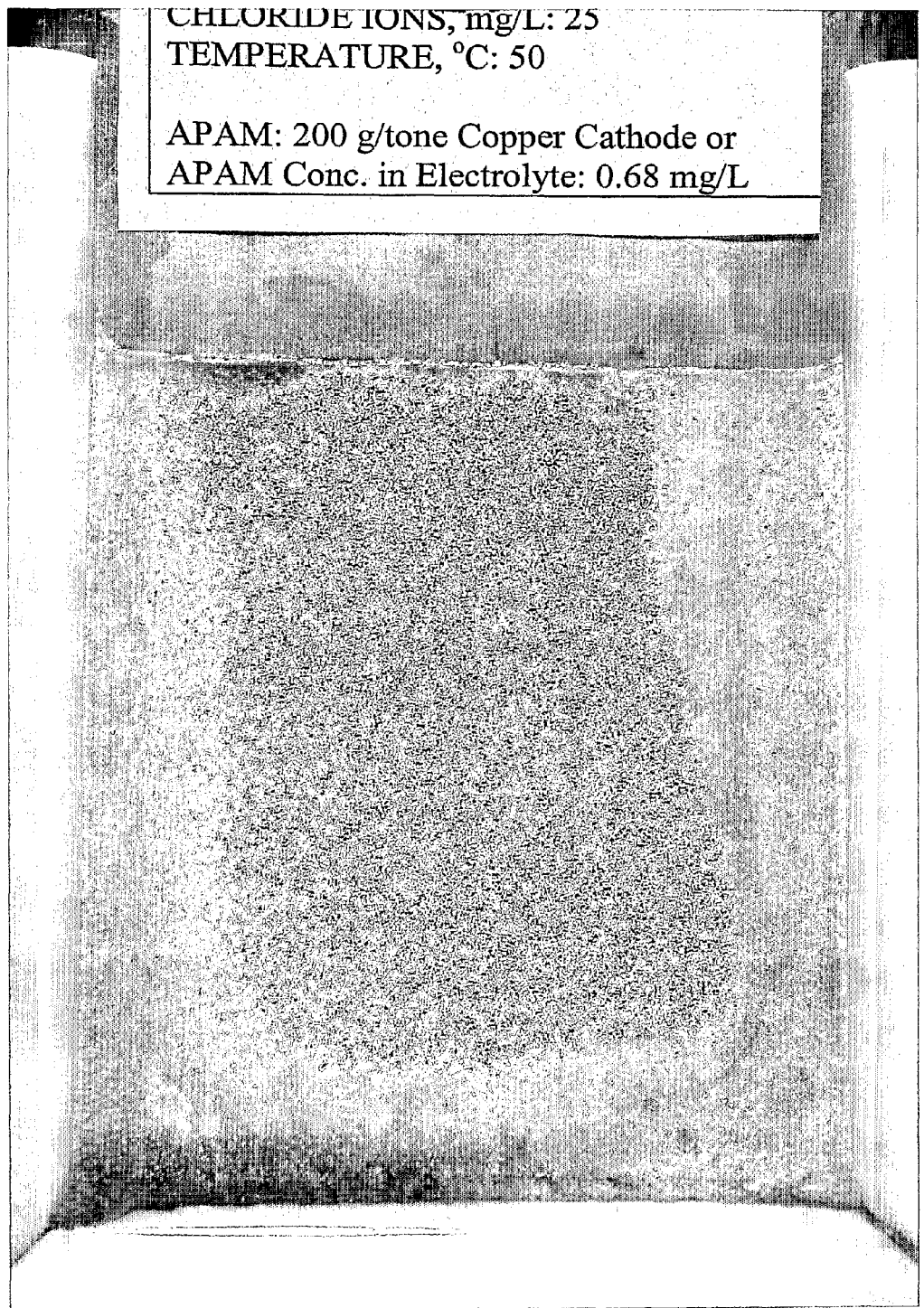
FIG 16: Copper Cathode Produced with APAM (2nd face)

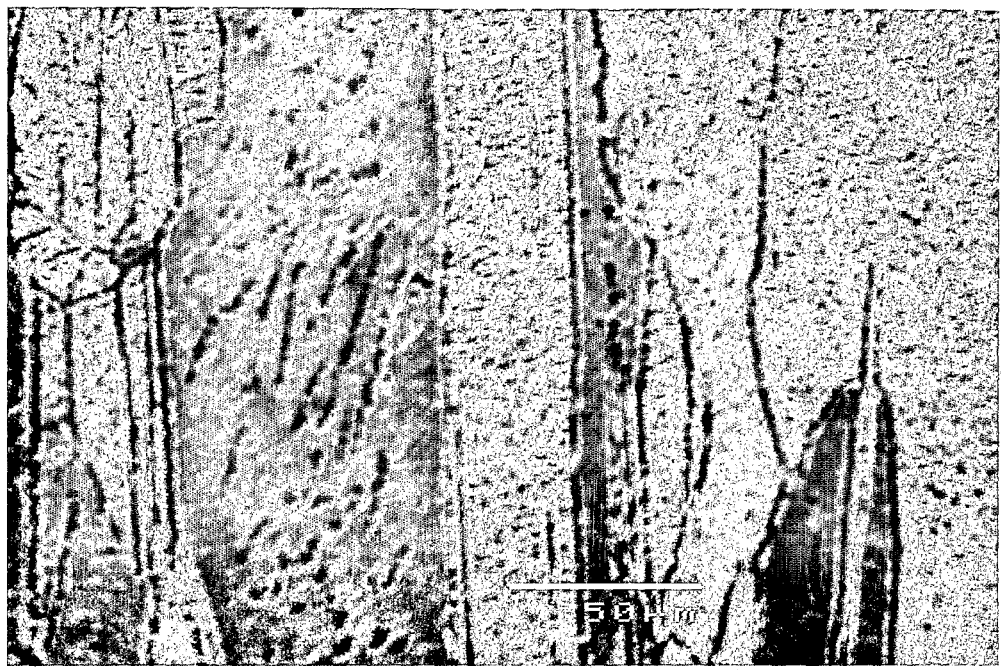
FIG 17: SEM micrograph of cross-sectioned commercial scale copper cathode produced using 0.2mg/L APAM and 0.6mg/LGuar (330 g/tonne Copper Cathode) at 240 Amp/m$^2$ current density.
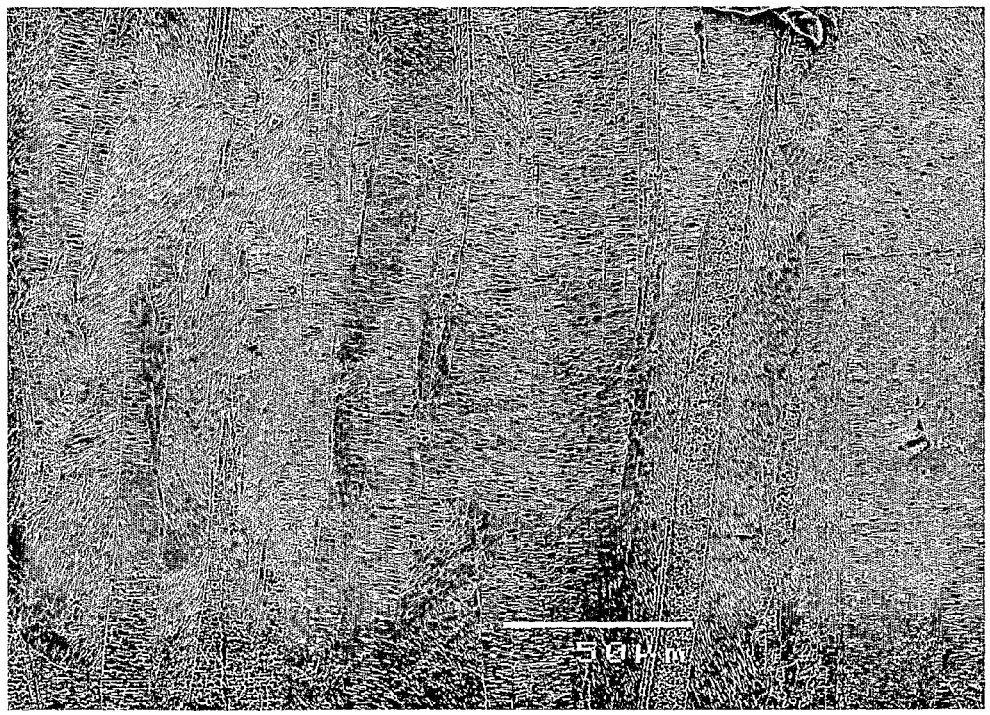
FIG 18: SEM micrograph of cross-sectioned commercial scale copper cathode trials conducted using 0.5mg/L APAM and 0.6mg/LGuar (330 g/tonne Copper Cathode) at 300 Amp/m$^2$ current density.

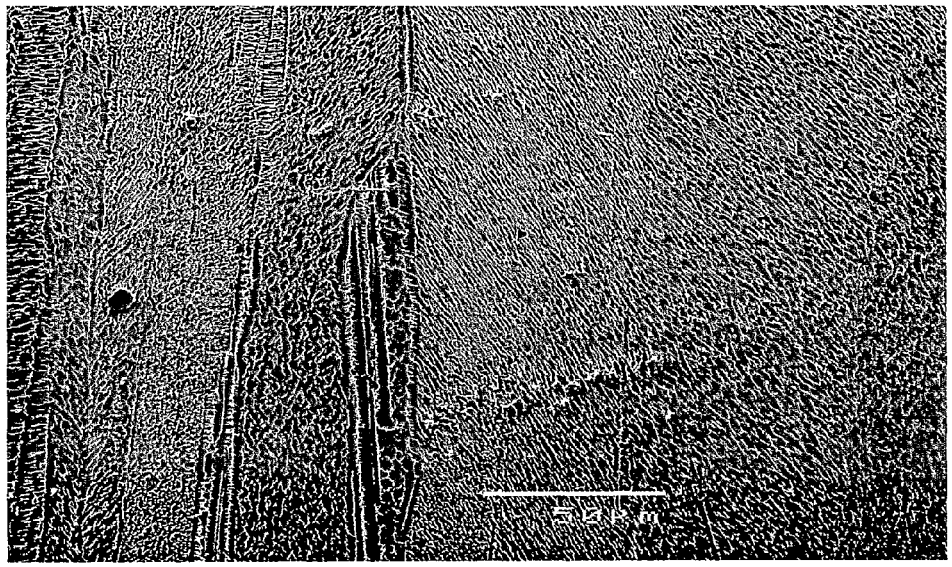
FIG 19: SEM micrograph of cross-sectioned commercial scale copper cathode trials conducted using 1.0mg/L APAM and 0.6mg/LGuar (330 g/tonne Copper Cathode) at 300 Amp/m$^2$ current density.
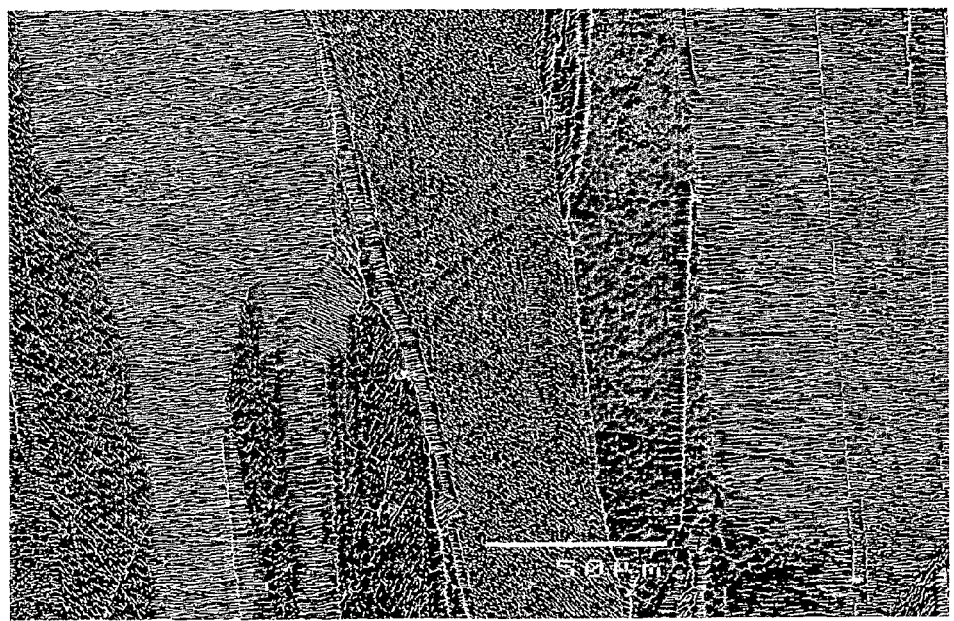
FIG 20: SEM micrograph of cross-sectioned commercial scale copper cathode trials using 0.6 mg/L Guar (330 g/tonne copper cathode) at 240Amp/m$^2$ current density.

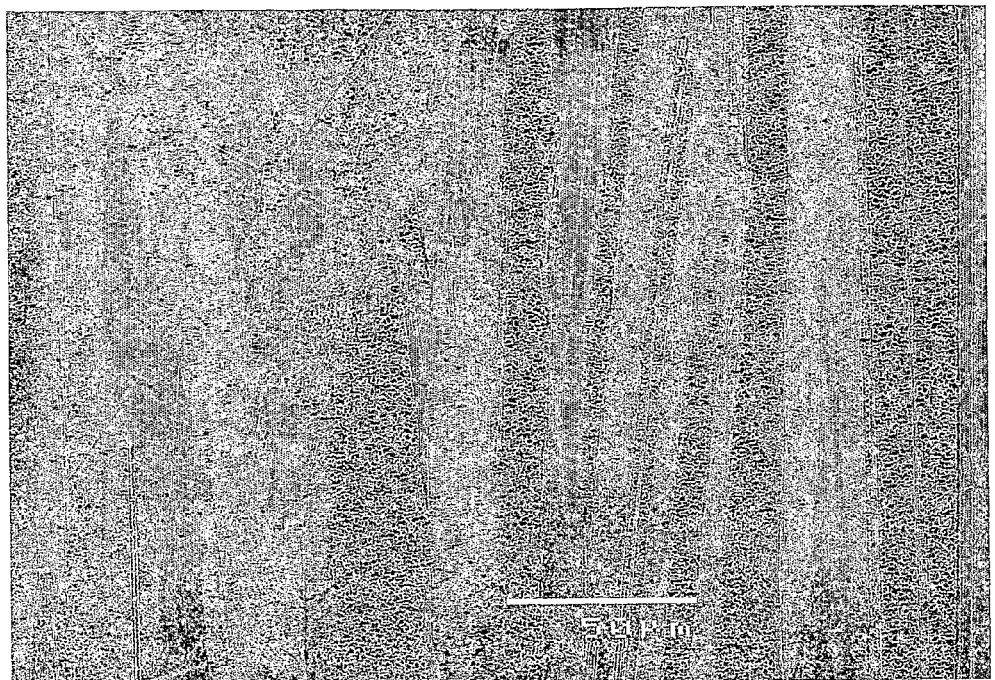
FIG 21: SEM micrograph of cross-sectioned commercial scale copper cathode trials conducted using 0.6mg/L Guar (330 g/tonne Copper Cathode) at 300 Amp/$m^2$ current density.
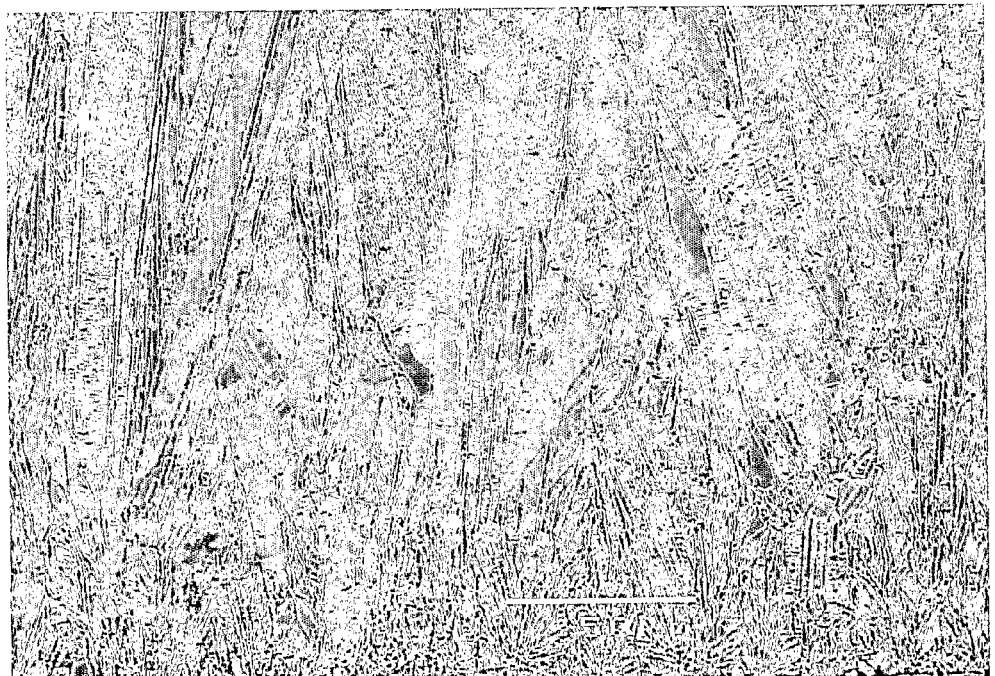
FIG 22: SEM micrograph of cross-sectioned bench scale copper cathode trials conducted using 0.68mg/L APAM (200 g/tonne Copper Cathode) at 340 Amp/$m^2$ current density.

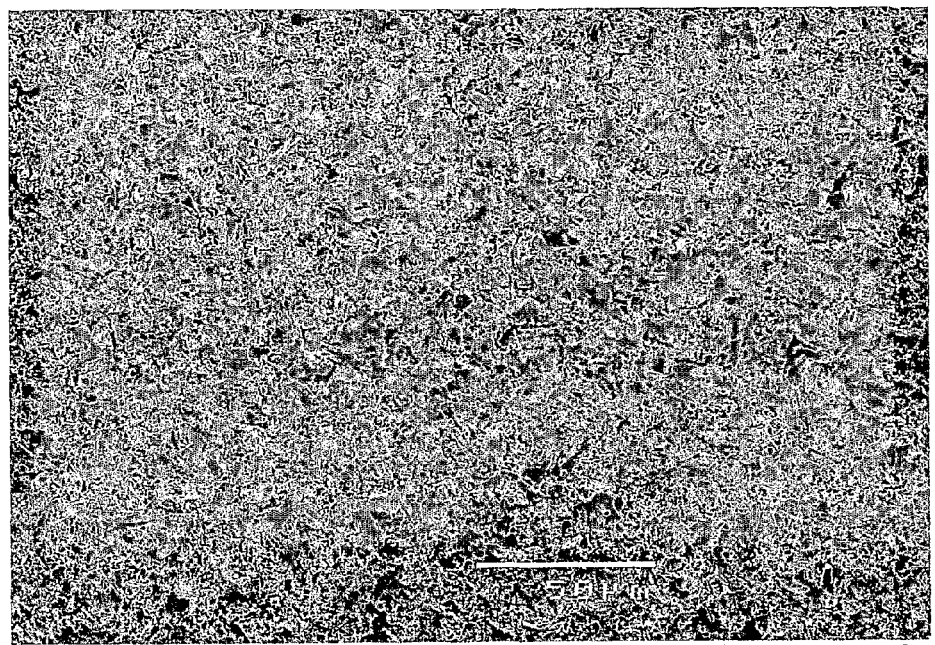
FIG 23: SEM micrograph of cross-sectioned bench scale copper cathode trials conducted using 0.68mg/L Guar (200 g/tonne Copper Cathode) at 340 Amp/m² current density.
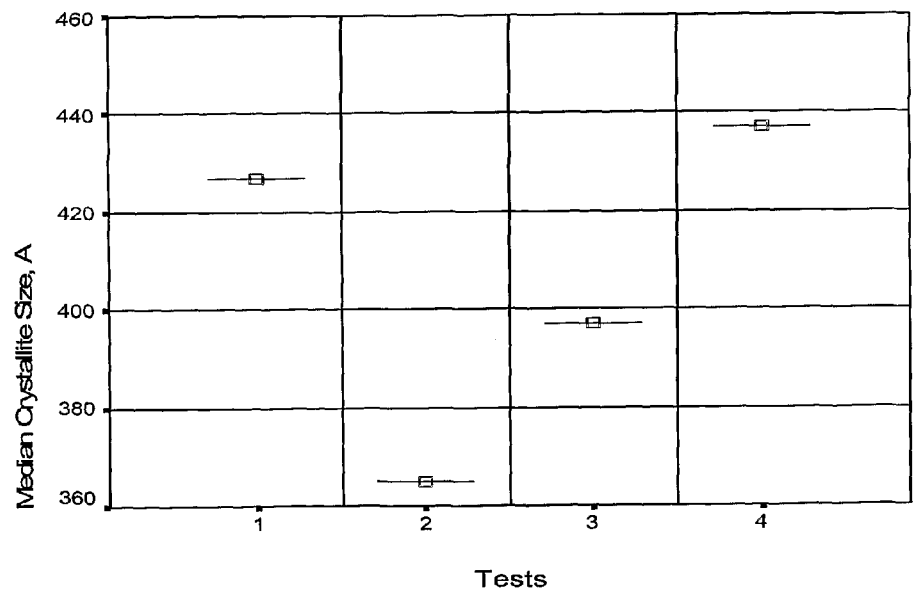
FIG 24: Median of Crystallite Size in the Presence and Absence of APAM. Test 1 - absence of APAM; Test 2 - Fresh APAM; Test 3 - 12 Hours hydrolysed APAM in the electrolyte and Test 4 - 22 hours APAM hydrolysed in the electrolyte.

PROCESS FOR COOPER ELECTROWINNING AND ELECTROREFINING

TECHNICAL FIELD

The present invention relates to the electrowinning and electrorefining of copper.

BACKGROUND ART

A known hydrometallurgical process for the production of copper cathodes from their oxide ores typically involves heap leaching, solvent extraction and electrowinning. A known process for copper cathode production from sulphide ores typically involves concentration or flotation of the ore, a pyrometallurgical process such as roasting or smelting, conversion then electrorefining.

Known electrowinning and electrorefining process which produce copper cathodes typically plate copper to a stainless steel substrate or copper starter sheet for several days, (eg. up to 7). Typically, current densities of between 250 and 320 $A/m^2$ are used. Anodes used in electrowinning may be lead alloy based.

A problem in electrowinning and electrorefining processes is dendrite formation, or formation of surface nodes or irregularities, on the copper cathode surface, that ultimately reduces the copper cathode production and copper quality/purity. The formation of dendrites closes the gaps between the cathodes and anodes within a cell and ultimately leads to short-circuiting if the dendrite reaches the anode, therefore the production of copper cathodes is decreased. If the dendrite reaches the anode it can also cause lead sulphate to flake off the anode and contaminate the cathode and/or the electrolyte solution. Moreover, the uncontrolled growth of dendrites precludes increasing the current density used in the tankhouse since the increased dendrite formation at higher current densities will further reduce the plant current efficiency. Uncontrolled dendrite formation, porosity and voids are also believed to reduce the purity of the copper cathode. It is thought that the electrolyte, which contains small amounts of iron in solution, lead in solid form and other impurities, is trapped in the inclusions formed during dendrite formation, and the more uncontrolled the dendrite formation the higher the level of impurities in the cathode.

Dendrite formation, porosity and/or voids of the copper deposit are directly related to nucleation and growth which may be controlled by the addition of organic additives. Known current attempts to optimise the electrodeposition of copper typically involve the addition or dosing of organic additives and chloride ions into the electrolyte. Animal glue (a levelling agent) and thiourea (a grain refiner) are commonly added to the electrolyte in electrorefining cells. Levelling agents eliminate surface roughness by inducing preferential metal deposition in surface recesses, resulting in the removal of surface height irregularities. Grain refiners induce new nucleates on the surface recesses of the electrode from which new crystals may start to grow. Chloride ion additions are known as a depolarizer. Chloride ions are understood to enhance the rate of charge-transfer, growth rate, or the formation of dendrites rather than the nucleation rate.

An organic additive added during electrowinning is guar gum, which is believed to act as a weak levelling agent and a brightener. However, formation of dendrites is not effectively controlled through the addition of guar gum and chloride ions to the electrolyte.

U.S. Pat. No. 5,733,429 describes the use of polyacrylic acid (repeating polymeric units having the structural formula of $—(CH_2—CH(COOX)—CH_2)_n—$ wherein X=H, periodic table group 1 or group 2 element salt, an ammonium salt or mixture thereof) to an ionic solution of copper for electrowinning to form a copper cathode. U.S. Pat. No. 5,733,429 discusses the formation of dendrites or surface nodes on the cathodes and the increased potential to short-circuit the cell. U.S. Pat. No. 5,733,429 also teaches the use of polyacrylic acids, alone, to prevent the formation of dendrites, to minimize anode flaking, and to prevent shorts in the circuit.

In U.S. Pat. No. 5,733,429 the preferred concentration of polyacrylic acid in the electrolyte is between 10 and 200 mg/L. Such a high level of dissolved organic material in electrolyte is known to cause significant carbon and hydrogen contamination of the copper cathode. This increased contamination is known to cause frequent breakages during the drawing process of the copper wire (see, for example, Chia, E. H., et al., Copper Rod and Cathode Quality as Affected by Hydrogen and Organic Additives, Wire Journal International, November 1992). Furthermore the process of U.S. Pat. No. 5,733,429 operates at current densities of 130-204 $Amp/m^2$ (12 and 18.75 $Amp/ft^2$) for electrowinning and 218 $Amp/m^2$ (20 $Amp/ft^2$) for electrorefining. These are very low current densities and, as such, do not require the addition of guar gum or glue. Thus U.S. Pat. No. 5,733,429 does not provide a solution to prevent dendrite formation in electrowinning or electrorefining processes involving high current densities.

U.S. Pat. No. 6,183,622 describes the use of a tertiary alkylamine of polyepichlorohydrin to improve the ductility of copper which is electrowon, electrorefined or electroplated. U.S. Pat. No. 6,183,622 does not teach that such additives have any effect on dendrite formation, but does suggest that the addition of "organics" to the electrolyte solution may interfere with the deposition process and that care needs to be taken in selecting additives to an electrolytic cell.

U.S. Pat. No. 6,284,121 describes the addition of a range of additives having molecular weights in the range of 200,000-10,000,000, in particular poly(sodium styrene 4 sulfonate), to an electroplating system for electroplating copper onto microelectronic components. The additive is described as preferentially adsorbing onto protruding surfaces such that deposition occurs without voids. The overall effect of the additive is to assist in the production of a smooth surface on the electrodeposited copper being plated onto the circuitry. U.S. Pat. No. 6,284,121 does not teach or predict that addition of high molecular weight compounds to the electrolyte solution prevent the formation of dendrites when electrowinning copper cathodes.

U.S. Pat. No. 2,798,040 describes the electrowinning of zinc and copper in the presence of acrylamide polymer (homopolymer and copolymers of acrylamide) by dissolving the acrylamide polymer in water or electrolyte, or adding in a solid form, to the copper electrolyte at a concentration of 25 to 150 mg/L to accomplish an improved deposition of metal. The electrolyte is described as containing 20-70 grams/L copper with a substantial proportion of sulphuric acid, and is essentially free of chloride ions, to obtain smooth bright copper deposits after 5, 13 and 16 hours of electrowinning at 25° C. and 172 $Amp/m^2$ (16 $Amp/ft^2$) current density.

Vereecken and Winand (Vereecken J. and Winand R., Influence of Polyacrylamides on the Quality of Copper Deposits from Acidic Copper Sulphate Solutions, Surface Technology 1976; 4:227-235) compared the influence of nonionic and cationic polyacrylamides (PAM) and Guar Gum (Guar) on the quality of copper deposits using "industrial" copper sulphate solution at 200 $Amp/m^2$ and 50° C. The electrolyte composition disclosed was, in g/L: copper, 50; Mn, 10; Mg, 4; Co, 1.5; phosphate ions, 10 and sulphuric acid, 50. Moreover, it is unclear in the paper whether PAM was prepared in water or at pH 3. Every 12 hours, 1 mg/L of PAM was dosed for 48 hours of electrowinning. This study concluded that the quality of the copper deposits obtained using Guar was always better than those obtained with both nonionic and cationic polyacrylamides and that the polarization behaviour (that is the variation in cell voltage at a constant current of the electrode) remains constant irrespective of the presence or absence of both nonionic and cationic polyacrylamides.

Vereecken and Winand conclude that, "Addition of polyacrylamides to pure acidic copper sulfate baths improves the quality of the deposit. In particular, with cationic polyacrylamides (10-20% cationic conversion) the deposits are smoother and contain thin elongated crystals oriented in the electric field. The viscosity of the 0.5% polyacrylamide aqueous solution at pH 3 also seems to play an important role: we found an optimum about 4 cP. On the other hand, the presence of polyacrylamides does not change the cathodic galvanic potential, the current efficiency and the orientation of the texture of the deposit. These inhibitors are not incorporated in the deposit. However, it should be noted that for all our experiments the quality of the deposits obtained with polyacrylamides was never as good as with guar gum."

Whilst both U.S. Pat. No. 2,798,040 and Vereecken and Winand (1976) describe the use of polyacrylamide in electrowinning, neither discloses the use of an electrolyte with chloride ions being present. Furthermore, Vereecken and Winand use a sulphuric acid concentration of 50 g/L, which is below typical plant operating parameters. It is highly unlikely that the processes of U.S. Pat. No. 2,798,040 and Vereecken and Winand could be applied to a commercial plant electrowinning process, since currently used organic extractants, e.g., ACORGA® M5640 or LIX® 984 require sulphuric acid concentrations from 150-200 g/L to strip the copper ions back from the organic phase to the aqueous phase. This aqueous solution comprises the advance electrolyte and is mixed with a recirculating electrolyte to then be fed to the tankhouse. The electrolyte in typical commercial copper electrowinning cells throughout the world contain 150-200 g/L sulphuric acid.

SUMMARY

In a first aspect, the present invention provides a method of electrowinning or electrorefining copper from a copper electrolyte solution which contains chloride ions, the method comprising the steps of:

(a) forming a polyacrylamide solution by dissolving polyacrylamide, having a molecular weight range of 5,000 to 20,000,000 Daltons, in an acidic medium and under conditions to form a polyacrylamide block copolymer having blocks of carboxyl groups dispersed along the polymer backbone;

(b) introducing the polyacrylamide solution into an electrolytic cell containing the copper electrolyte solution at a polyacrylamide concentration of 0.01-10 mg/L; and (c) electroplating copper from the copper electrolyte solution to form a copper cathode.

In a second aspect, the present invention provides an additive for a copper electroplating electrolyte, the additive being obtainable by dissolving polyacrylamide, having a molecular weight range of 5,000 to 20,000,000 Daltons, in an acidic medium and under conditions to form a polyacrylamide block copolymer having blocks of carboxyl groups dispersed along the polymer backbone.

At various points in this specification the additive is referred to as "activated polyacrylamide" or "APAM".

It has been discovered that the addition of APAM to an ionic copper electrolyte for electroplaning, results in the prevention/minimisation of dendrite copper growth on the electrodes.

In a third aspect, the present invention provides the use of APAM in the electrowinning or electrorefining of copper.

The acidic medium in which the activated polyacrylamide is formed may be selected from a sample of the ionic copper electrolyte solution (diluted), hydrochloric acid, phosphoric acid or sulphuric acid.

Typically the acidic medium in which the activated polyacrylamide is formed is a dilute sample of the ionic copper electrolyte solution.

Typically the temperature of the acidic medium is in the range 50 to 90° C.

Typically the polyacrylamide is activated by heating it in the acid medium for 1 to 24 hours under stirring conditions.

Typically the activated polyacrylamide solution is added into the copper electrolyte at a concentration of polyacrylamide between 0.01 to 10 mg/L.

The ionic copper electrolyte solution may also comprise, thiourea, animal glue and/or a polysaccharide. The polysaccharide is typically guar gum.

In one embodiment the ionic copper electrolyte solution comprises chloride ions at a concentration of 2-100 mg/L, more preferably between 10-70 mg/L. In one embodiment the ionic copper electrolyte solution can be acidified using sulphuric acid. Typically the ionic copper electrolyte comprises 25-55 g/L cupric ions; 150-200 g/L sulphuric acid; 15-70 mg/L chloride ions.

Typically the electroplating step is carried out over a number of days, typically up to 7, utilising current densities of between 240-400 Amp/$m^2$. A typical current density employed is between approximately 300 to 350 Amp/$m^2$.

BRIEF DESCRIPTION OF THE DRAWINGS

Notwithstanding any other forms which may fall within the scope of the present invention, specific embodiments of the present invention will now be described, by way of example only, with reference to the following figures in which:

FIG. 1: shows the chemical structure of nonionic polyacrylamide and ionic or hydrolyzed polyacrylamide;

FIG. 2: is a graph showing the relationship between polyacrylamide preparation media on surface roughness of copper deposits;

FIG. 3: is a graph showing the ageing of APAM in 16-fold dilute electrolyte and full strength electrolyte which shows that APAM ageing is insignificant in 16-fold diluted electrolyte;

FIG. 4. is a picture of copper cathodes showing a comparison of the use of guar and APAM in 12 hours continuous electrowinning;

FIG. 5: is a cyclic voltammetry graph showing the depolarization behaviour of Guar on pre-plated copper at 45° C., at 10 rpm of RCE, 2 mg/L Guar;

FIG. 6: is a graph showing the depolarization behaviour of Guar at 30 and 40 mA/$cm^2$ derived from FIG. 5;

FIG. 7: is a cyclic voltammetry graph showing the polarization behaviour of APAM on pre-plated copper at 45° C., at 10 rpm of RCE, 2 mg/L APAM;

FIG. 8: is a graph showing the polarization behaviour of APAM on pre-plated copper at 30 and 40 mA/$cm^2$ derived from FIG. 7;

FIG. 9: is a cyclic voltammetry graph showing the polarization behaviour of APAM on pre-plated copper at 65° C., at 10 rpm of RCE, 2 mg/L APAM;

FIG. 10: is a graph showing the polarization behaviour of APAM on pre-plated copper at 30 and 40 mA/cm$^2$ derived from FIG. 9;

FIG. 11: is a schematic representation of a bench scale electrowinning cell design for a continuous process;

FIG. 12: is a schematic representation of a bench scale electrowinning process;

FIG. 13: is a picture of the Copper Cathode Produced with Guar (1$^{st}$ face);

FIG. 14: is a picture of the Copper Cathode Produced with Guar (2$^{nd}$ face);

FIG. 15: is a picture of the Copper Cathode Produced with APAM (1$^{st}$ face);

FIG. 16: is a picture of the Copper Cathode Produced with APAM (2$^{nd}$ face);

FIG. 17: is a SEM micrograph of cross-sectioned commercial scale copper cathode trials conduced using 0.2 mg/L APAM and 0.6 mg/L Guar (330 g/tonne Porous Copper Cathode) at 240 Amp/m$^2$ current density;

FIG. 18: is a SEM micrograph of cross-sectioned commercial scale copper cathode trials conducted using 0.5 mg/L APAM and 0.6 mg/L guar (330 g/tonne Non-Porous Copper Cathode) at 300 Amp/m$^2$ current density;

FIG. 19: is a SEM micrograph of cross-sectioned commercial scale copper cathode trials conducted using 1.0 mg/L APAM and 0.6 mg/L Guar (330 g/tonne Non-Porous Copper Cathode) at 300 Amp/m$^2$ current density;

FIG. 20: is a SEM micrograph of cross-sectioned commercial scale copper cathode trials using 0.6 mg/L Guar (330 g/tonne Porous Copper Cathode) at 240 Amp/m$^2$ current density;

FIG. 21: is a SEM micrograph of cross-sectioned commercial scale copper cathode trials conducted using 0.6 mg/L Guar (330 g/tonne Porous Copper Cathode) at 300 Amp/m$^2$ current density;

FIG. 22: is a SEM micrograph of cross-sectioned bench scale copper cathode trials conducted using 0.68 mg/L APAM (200 g/tonne Non-Porous Copper Cathode) at 340 Amp/m$^2$ current density;

FIG. 23: is a SEM micrograph of cross-sectioned bench scale copper cathode trials conducted using 0.68 mg/L Guar (200 g/tonne Porous Copper Cathode) at 340 Amp/m$^2$ current density; and FIG. 24: is a graph that compares the median of crystallite size in the presence and absence of APAM.

DETAILED DESCRIPTION OF SPECIFIC EMBODIMENTS

A polyacrylamide of molecular weight (MW) between 5,000 to 20 million Daltons was dissolved in an acid medium at a concentration of 100 mg/L to 20 g/L. The acid medium was a sample of diluted ionic copper electrolyte solution. The acid medium was optionally sulphuric acid, hydrochloric acid or phosphoric acid. The polyacrylamide solution is activated by maintaining it at a temperature of 50 to 90° C. for a period of 1 to 24 hours under constant stirring.

Copper was electroplated onto a cathode substrate, usually stainless steel, using current densities of 240-350 Amp/m$^2$ over a period of several days, typically 7.

EXAMPLE 1

A General Example 5 g polyacrylamide (PAM) was added perliter of diluted electrolyte. The electrolyte was typical plant electrolyte (30-55 g/L cupric ions and 150-200 g/L sulphuric acid) diluted by a factor of between 1:1 and 1:32 with distilled water. The mixture was maintained at a constant temperature of 50° C. (122° F.) for two hours under stirring conditions. The polyacrylamide is activated by undergoing a partial hydrolysis in the acidic solutions during this time (2 hours). This process was conducted under high shear stirring conditions, to enhance the "activation" process.

The activated solution can be transferred to a dosing tank. Agitation takes place in the dosing tank using a low shear type stirrer, such as concentric cylinder mixer or A310 impeller. The activated polyacrylamide (APAM) was added or dosed into the electrolytic cells at a rate of between 0.01-10 milligrams perliter of electrolyte.

The electrowinning step was conducted using a 316L 2B finish stainless steel cathode substrate in the presence of 0.5 or 1.0 mg/L activated polyacrylamide with an electrolyte solution containing 25 mg/L chloride ions, 36 g/L copper ions and 160 g/L sulphuric acid at 50° C. The copper was deposited at the cathode using a current density of 300 Amp/m$^2$ over a period of 6 hours.

Under the above conditions no dendritic growth was observed. When the experiments were repeated, under identical conditions, with no activated polyacrylamide present in the electrolyte solution, dendritic growth was observed.

The equipment, a rotating cylinder electrode and its principles of operation are briefly described below. This equipment was used to assess the effectiveness of polyacrylic acid, Guar, polyacrylamide and activated polyacrylamide.

A Rotating Cylinder Electrode as Electrowinning Cell

A rotating cylinder electrode (RCE) prepared of 316L stainless steel according to Barkey et al (J. Electrochem. Soc. 1989; 138(8): 2199-2207) was used to simulate the hydrodynamic conditions of a commercial electrowinning plant. The RPM value defines the diffusion layer thickness using an empirical equation, such as those described in Barkey et al. and, Newman J. and Thomas-Alyea K E. (Electrochemical Systems, Third ed., Hoboken, New Jersey: John Wiley & Sons, Inc.; 2004).

The rotation of one electrode in the RCE electrochemical cell can produce flow patterns that assist in reducing the concentration gradient and contribute to the transport of materials to the electrode surface. Very low rotation speeds lead to simple laminar flow in concentric circles in which the fluid velocity is perpendicular to the direction of mass transfer. This simple flow pattern becomes unstable at higher rotation speeds, particularly if the inner electrode rotates and Taylor vortices or laminar flow with vortices can be obtained resulting in an enhanced mass transfer (Newman et al, Electrochemical Systems, 2004). Moreover, in the laminar flow Taylor vortices region, there is a radial and axial motion, inward at one point and outward at different axial position superimposed to the tangential motion. At higher rotation speeds, the flow becomes turbulent with Taylor vortex flow or turbulent (Wang, L et al., Reappearance of Azimuthal Waves in Turbulent Taylor-Couette Flow at Large Aspect Ratio, Chemical Engineering Science, 60, 2005, 5555-5568) with further enhancement of the mass transfer. The critical Reynolds number is the Reynolds number above which flow becomes turbulent. The critical Reynolds number for a RCE is 200 (Gabe, D., Plating and Surface Finishing, 9, 1995, 69-76). On the RCE used in these experiments, the Reynolds numbers at 10 rpm and 45° C. and at 10 rpm and 65° C. are 1124 and 1586 respectively. Therefore, the fluid flow at the RCE used in the present work is turbulent.

A dimensionally stable anode (DSA) sourced from ELTECH Systems Corporation, USA was used as anode. The active area of the RCE was 27.91 cm² and the number of coulombs applied to each test varied from 12,000 to 36,000. The electrode gap was 40 mm, which is similar to most commercial copper electrowinning plants and the RPM of the RCE was controlled using a Movitrac controller and 0.37 kW motor (RF27D17104) with gear box both from SEW Eurodrive.

A program was developed using Mathcad12 to derive the diffusion layer thickness for the RCE. The physicochemical properties of the electrolyte were obtained from the data of Price and Davenport (Price D, Davenport W. Physico-Chemical Properties of Copper Electrorefining and Electrowinning Electrolytes. *Metallurgical & Materials Transactions B-Process Metallurgy & Materials Processing Science* 1981;12B: 639-643). The equation for the rotating cylinder electrode, Equation 1, was used to calculate the limiting current density (Arvia et al. Mass Transfer in the Electrolysis of CuSO₄—H₂SO₄ in Aqueous Solutions under Limiting Current and Forced Convection Employing a Cylindrical Cell with Rotating Electrodes, Electrochimica Acta, 1962, 7, 65-78).

$$i_L = 0.079 \ln F C_b \left(\frac{di}{v}\right)^{-0.30} (U)^{0.70} \left(\frac{do}{di}\right)(Sc)^{-0.644} \quad [1]$$

where $i_L$ is the limiting current density, mA/cm2;
n is the number of electrons transferred in the electrode reaction;
F, Faraday's constant, 96,487 C/equivalent;
D, diffusion coefficient of electrolyte, cm²/s;
$C_b$ is copper concentration in the bulk solution, mol/cm³;
di and do are the diameter of the inner, rotating and outer stationary cylinders, cm;
Re is the Reynolds number, $(\omega d^2/2 v)$;
ω is the rotation speed in rad/s;
v is the kinematic viscosity, cm²/s; and
Sc is the dimensionless Schmidt number, (v/D).

The Nernst diffusion model, Equation 2, was used to calculate the diffusion layer thickness.

$$i_L = \frac{nFDC_b}{\delta} \quad [2]$$

where δ is the diffusion layer thickness.

The RCE was polished with 1 μm and 0.25 μm diamond paste and had an initial surface roughness of 0.15±0.04 μm. Once the copper was detached from RCE, the RCE was immersed in 10% nitric acid for about 60 seconds, polished with 0.25 μm diamond paste, washed with distilled water, immersed again in the nitric acid solution for another 60 seconds and completely washed with distilled water. This sequence was repeated after each test and the stainless steel maintained its brightness.

1.2 Effect of Polyacrylamide Preparation Media on Surface Roughness of Copper Cathode The experiments were designed to detect the effect of hydrolysis of polyacrylamide on the surface roughness of electrowon copper. Therefore, these experiments indirectly evaluate the adsorption of the hydrolysed polyacrylamide onto the stainless steel substrate and copper metal during the electrodeposition process. Tests were performed on the same organic additives as examined by Vereecken and Winand (1976); and Pye and Schurz (U.S. Pat. No. 2,798,040, 1957). The organic additives were pre-treated in different conditions. These tests were replicated to confirm accuracy of surface roughness with quantitative measurement. The replicated tests emphasize the hydrolysis conditions used by Vereecken and Winand (1976), and Pye and Schurz (U.S. Pat. No. 2,798,040, 1957) to confirm their overall qualitative surface roughness assessments.

A series of experiments were undertaken to determine the effect of PAM hydrolysis in water at 25° C. and in the full-strength electrolyte at 50° C. as per U.S. Pat. No. 2,798,040. Other preparation media in acid solutions included diluted solutions of the full-strength electrolyte. This dilution was conducted by systematically halving the 160 g/L sulphuric acid concentration in the electrolyte. Therefore, PAM was prepared in full-strength electrolyte (160), 80, 40, 20 and 10 g/L sulphuric acid concentrations at 50° C. for 2 hours and in water at 25° C. for 2 hours. The pretreated PAM was then dosed to the EW cell.

The PAM was also prepared in mildly alkaline aqueous solution. However, a maximum pH value of 8.5 was selected due to the impracticality of adding additional sodium hydroxide to the electrolyte of a commercial plant. At higher pH values than 8.5, sodium sulphate may unnecessarily be increased in the electrolyte. The preparation temperature and time were 50° C. and 3 and 2 hours residence time unless otherwise stated.

The PAM used was a high-molecular weight PAM i.e., 15 million Dalton Ciba Magnafloc® 800HP known as neutral or nonionic PAM. The chemical structure of neutral or nonionic and ionic or hydrolyzed polyacrylamide is shown in FIG. 1.

In these experiments, the dependent variable was the measurement of the surface roughness of the copper electrodeposit produced. Surface roughness measures the topography of the sample and an increment in surface roughness precedes the formation of dendrites visible to the naked eye. Therefore under constant conditions, a low surface roughness results in a lower tendency to form dendrites.

The surface roughness was collected using a Mahr Perthometer M1 Perthometer M1 with PFM Drive Unit, (Mahr GMBH, Germany; 2001) using a 2 μm stylus tip radius. It was calibrated with its PGN-3 (Rz=2.9 μm, Ra=0.79 μm) standard roughness profile. The Mahr Perthometer M1 uses a Gaussian profile filter to eliminate errors due to long-wave frequency components of the sample (waviness). The surface roughness measurement was conducted before the copper deposit was detached from the rotating cylinder electrode (RCE) and along the height of the electrode. This measurement process was repeated 8 times around the cylinder electrode on equidistantly distributed areas. Table 1 summarizes the overall test conditions and results in detail.

One-way ANOVA between groups indicates that Test 4 has a statistically significantly lower mean surface roughness than either Test 3, prepared in water or Test 8, prepared in full-strength electrolyte. In acid solutions, the significantly different mean surface roughness sequentially increases as the concentration of sulphuric acid increases indicating the true effect of acid concentration on the hydrolysis of polyacrylamide. The results of Test 3, prepared in water, where hydrolysis is insignificant, and Tests 7 and 8, prepared in 2-fold diluted electrolyte and full-strength electrolyte, respectively, are similar with 95% confidence interval. It can be therefore concluded that PAM hydrolysis product(s) from Tests 3, 7 and 8 is/are closely similar in terms of their adsorption behaviour on copper metal.

TABLE 1

Effect of PAM Preparation on Surface Roughness

| | Test No. | | | | | | | |
|---|---|---|---|---|---|---|---|---|
| | 1 | 2 | 3 | 4 | 5 | 6 | 7 | 8 |
| No. of Replicates | 1 | 1 | 3 | 4 | 1 | 2 | 1 | 2 |
| Sulphuric Acid Conc., g/L | alkaline | alkaline | Water | 10 | 20 | 40 | 80 | 160 |
| pH Preparation Media | 8.5 | 8.5 | 6 | 1.5 | 1.25 | 1.14 | 1 | <1 |
| Preparation Temp., °C | 50 | 50 | 25 | 50 | 50 | 50 | 50 | 50 |
| Residence Time, Hrs | 3 | 2 | 2 | 2 | 2 | 2 | 2 | 2 |
| EW PAM/APAM Conc. mg/L | 1 | 1 | 1 | 1 | 1 | 1 | 1 | 1 |
| EW Time, Hrs | 6 | 6 | 6 | 6 | 6 | 6 | 6 | 6 |
| Voltage Drop, V | 1.46 | 1.42 | 1.45 | 1.35 | 1.4 | 1.38 | 1.36 | 1.33 |
| C. Density, mA/cm$^2$ | 30 | 30 | 30 | 30 | 30 | 30 | 30 | 30 |
| Electrolyte Temp., °C | 50 | 50 | 50 | 50 | 50 | 50 | 50 | 50 |
| RCE rpm | 10 | 10 | 10 | 10 | 10 | 10 | 10 | 10 |
| Surface Rough., Ra μm | 8.47 | 7.03 | 7.09 | 6.59 | 7.11 | 7.09 | 7.29 | 7.32 |
| Ra Standard Dev., μm | 0.93 | 0.43 | 0.44 | 0.47 | 0.41 | 0.85 | 0.49 | 0.61 |
| ANOVA - Sig. Tuckey HSD | 0.00 | 0.54 | 0.04 | | 0.32 | 0.11 | 0.06 | 0.00 |
| Dendrites < 0.1 mm length | 10 | Nil | Nil | Nil | Nil | Nil | Nil | Nil |
| S. Steel spots < 1 × 1 mm | Nil | Nil | Nil | Nil | Nil | 1 | Nil | Nil |

The only apparent difference is that PAM hydrolysis in Tests 7 and 8 has aged 2 hours more than that in Test 3. The less optimal results obtained from Tests 3 and 8 where polyacrylamide was prepared in water and full-strength electrolyte are similar to the preparation media of polyacrylamide reported in the studies of Pye and Schurz (U.S. Pat. No. 2,798,040, 1957), and Vereecken ad Winand (1976) who indicated that polyacrylamide controlled the surface roughness of electrowon copper less effectively than guar. The polyacrylamide prepared in Test 4 is named 'activated polyacrylamide' (APAM) throughout this application and it is compared with polyacrylic acid and Guar, the industry-standard additives.

FIG. 2 shows the error bar plot from this test work. The central box shows the mean concentration for constituent and the "whiskers" show the 95% confidence interval (CI). Since 8 replicate measurements of each test sample were collected, the number of replicate tests can be determined by dividing N (at the bottom of the graph) by 8. Thus it can be seen that the EW test with PAM prepared in water (Test 3) was repeated three times and in full-strength electrolyte two times (Test 8).

It can be seen in Table 1 and FIG. 2 that PAM was prepared at pH value of 8.5 for Tests 1 and 2 for 3 and 2 hours, respectively. Test 1 produced a higher surface roughness (8.47±0.93 μm) than any other test and the surface roughness from Test 2 was 7.03±0.43 μm. Surface roughness from hydrolysis of PAM in mildly alkaline solutions was the highest possibly due to the higher concentration of carboxylic acid and its different distribution in the polymer chain than those in 16-fold diluted electrolyte, Test 4. Moreover, the results obtained from Tests 1 and 2 are less likely to the used in plant practice unless that PAM is prepared continuously to maintain 2 hours or less residence time at pH 8.5.

A one-way ANOVA analysis indicates that PAM hydrolysed in 16-fold diluted electrolyte at 50° C. for two hours produces (Test 4—repeated 4 times) a statistically significantly lower value ($\alpha<0.05$) of the cathode surface roughness than when PAM is hydrolysed in water at 25° C. (Test 3 repeated 3 times) or in full-strength electrolyte at 50° C. (Test 8—repeated twice). Test 4 is not statistically significant different from Tests 5 and 6 (repeated twice) at $\alpha<0.05$ but is different at $\alpha=0.32$ (Test 5) and 0.11 (Test 6). It can be seen that the significance of the difference between the results for Test 4 and Tests 5, 6, 7 and 8 increases as the difference in acidity increases. The relatively low significance for the difference between Tests 4 and 5, and Tests 4 and 6 reflects the relatively small difference in acidity between these tests.

The results from Test 4 in which PAM was prepared at a pH value of about 1.5 are consistent with PAM hydrolysis at a pH value of approximately 2 in which hydrolysis predominantly produces blocks of acrylic acid in acrylamide segments with an average sequence length of carboxyl groups of 14 instead of 1.4 obtained from alkaline hydrolysis (Panzer H, Halverson F. Blockiness in Hydrolyzed Polyacrylamide Flocculation Dewatering, Proc. Eng. Found. Conf. 1989:239-249). The results also agree with those presented by Moradi-Araghi et al. (Role of Imidization in Thermal Hydrolysis of Polyacrylamides. *Water-Soluble Polym. Pet. Recovery, [Proc. Natl. Meet. ACS]* 1988:271-278) and Halverson F. et al. (Sequence Distribution of Carboxyl Groups in Hydrolyzed Polyacrylamide. Macromolecules 1985; 18(6):1139-1144). Moreover, the formation of polyacrylimide (imide) is insignificant in weakly acidic solutions such as at pH 2 and in alkaline solutions. It is therefore proposed that the particular effectiveness of activated polyacrylamide (APAM) produced in 16-fold diluted electrolyte reflects an optimum sequence length of carboxyl groups associated with acrylamide hydrolysis.

The lowest surface roughness result obtained from Test 4 is thought to be due to the improved adsorption of 1 mg/L of APAM to the copper cathode surface for over six hours. This claim is consistent with the findings of Grchev et al. (Grchev T, Cvetkovska M, Stafilov T, Schultze J. *Adsorption of Polyacylamide on Gold and Iron from Acidic Aqueous Solutions*. Electrochimica Acta 1991;36(8):1315-1323) who investigated the adsorption of different molecular weights of polyacrylamide on gold and mild steel in strong sulphuric and hydrochloric acid solutions for corrosion inhibition. It was reported that the surface coverage (adsorption) in acid solutions was directly related to the molecular weight of the polyacrylamide. The surface coverage at 2-3 ppm polyacrylamide concentration decreased from about 0.52, 0.3, 0.2 to 0.02 as the polyacrylamide molecular weight increased from $5\times10^3$, $2.2\times10^4$, $2.25\times10^5$ and $1.5\times10^6$, respectively. Moreover, Polyacrylamide with a molecular weight of $5\times10^3$ (g/mol) produced a surface coverage value close to 1 at 20° C. and it decreased to 0.25 surface coverage at 80° C. at the Au/solution interface.

High-molecular weight polyacrylamide and hydrolysed polyacrylamide are used as flocculants and thickeners whereas low-molecular-weight polyacrylamide and hydrolysed polyacrylamide are used as coagulants and mud stabilizers due to their exceptional adsorption properties. In strong acid solutions the net charge of a metal oxide adsorbent is positive. In addition to the acrylamide hydrogen bond responsible for absorption of neutral polyacrylamide, electrical forces between metal-$OH_2^+$ and dissociated acrylic acid and acrylate groups increase the amount of polymer adsorbed. In simple terms carboxyl groups are characterized by their high affinity to the surface of oxides (Drzymala J, Fuerstenau D. *Adsorption of Polyacrylamide, Partially Hydrolyzed Polyacrylamide and Polyacrylic Acid on Ferric Oxide and Silica*. Process Technology Proceedings 1987;4(Flocculation Biotechnol. Sep. Syst.):45-60; Pefferkorn E. *Polyacrylamide at Solid/Liquid Interfaces*. Journal of Colloid & Interface Science 1999;216:197-220; Caulfield M J, Qiao G G, Solomon D H. *Some Aspects of the Properties and Degradation of Polyacrylamides*. Chemical Reviews (Washington, D.C., United States) 2002;102(9):3067-3083; Chibowski S, Wisniewska M. *Study of Electrokinetic Properties and Structure of Adsorbed Layers of Polyacrylic Acid and Polyacrylamide at Ferric Oxide-Polymer Solution Interface*. Colloids and Surfaces A: Physicochemical and Engineering Aspects 2002; 208(1-3):131-145).

Slimes in copper electrorefining contain kupferglimmer (4.2% O, 16% Ni, 38% Cu, 31% Sn and 0.1% S) as the dominant oxide phase and tin can also substitute antimony in the Cu—Sb—Ni oxide phase (Hiskey J B, Campin S C. *Morphological and XRD Characterization of Kupferglimmer in Copper Anode Slimes*. In: Dutrizac J. E., Clement C G, editors. Copper 2003-Cobre 2003 Copper Electrorefining and Electrowinning; 2003; Santiago, Chile: Canadian Institute of Mining, Metallurgy and Petroleum; 2003, pp-309-324; T. T. Chen, J. E. Dutrizac, Metallurgical Transaction B, V. 24B, December 1993, pp. 997-1007). APAM may also assist the settlement of copper electrorefining slimes since block copolymers have an affinity to oxide surfaces, Drzymala L. et al cited above.

It is therefore proposed that the optimal conditions for the preparation of the most effective APAM, is using 16-fold diluted electrolyte at above 50° C. for at least two hours, which yields a pH of approximate value of 1.5. APAM not only produces the lowest surface roughness of the copper deposit but also can be used as flocculant and coagulant to assist the settlement of slimes during copper electrorefining. Thus, solids in suspension in the electrolyte can be reduced and their entrainment in the copper cathode decreased.

EXAMPLE 2

Comparison of Polyacrylic Acid and Activated Polyacrylamide

Electrowinning tests were carried out to determine the comparative effectiveness of polyacrylic acid (PAA) and APAM as organic additives. This work was undertaken to compare the efficiency of APAM with PAA. The use of PAA was described in the U.S. Pat. No. 5,533,429 patent. The effectiveness of these organic additives in copper electrowinning was determined by measuring the surface roughness of the copper deposit.

PAM was dissolved in 16-fold diluted synthetic electrolyte (sulphuric acid, 10 g/L; copper, 2.25 g/L after dilution) and PAA in a solution of sodium hydroxide at pH 11.5 at 50° C. of a concentration of 1000 mg/L for 2 hours throughout this testwork unless otherwise stated. The initial concentrations of the components of the synthetic electrolyte used in APAM preparation were: copper, 36 g/L; sulphuric acid, 160 g/L and chloride ions, 25 mg/L. The electrolyte volume was 3.75 L.

Both PAA and APAM may undergo hydrolysis under the conditions that are found in electrowinning cells, to the extent that their efficacy may be decreased. Tests were undertaken to study the extent to which the efficacy of these two additives changed when held in full-strength electrolyte under plant conditions. To do this, the EW tests were undertaken in two steps: the first four hours and the last 4 hours out of 12 hours residence time in the electrolyte. In the intermediate time (4 Hrs), the electrolyte temperature was kept constant at 50° C. The first tests were carried out just after the 2 hours preparation at 50° C. in pH 11.5 sodium hydroxide (PAA) and 16-fold DE. The results are presented in Table 2.

TABLE 2

Surface Roughness Using Polyacrylic Acid and Polyacrylamide

| | EW Test | | | |
| --- | --- | --- | --- | --- |
| | Polyacrylic Acid | | APAM | |
| Test No. | 0-4 Hrs 80A | 8-12 Hrs 80B | 0-4 Hrs 79A | 8-12 Hrs 79B |
| PAA/PAM Prep. Res. Time, Hrs | 2 | 2 | 2 | 2 |
| PAA/APAM Conc., mg/L | 1 | 1 | 1 | 1 |
| EW Time, Hrs | 4 | 4 | 4 | 4 |
| Current Density, $mA/cm^2$ | 30 | 30 | 30 | 30 |
| Electrolyte Temperature, ° C. | 50 | 50 | 50 | 50 |
| RCE rpm | 20 | 20 | 20 | 20 |
| Dendrite Observation | None | None | None | None |
| Surface Roughness, Ra, μm | 5.70 ± 0.20 | 7.78 ± 1.20 | 5.06 ± 0.52 | 5.50 ± 0.66 |

These experiments demonstrate that PAA consistently produced higher surface roughness than APAM. Moreover, PAA lost its efficacy at a much greater rate than APAM. It is noteworthy that APAM maintains its ability to produce smooth copper deposit over a period of at least 12 hours under conditions typical of contemporary electrowinning and electrorefining plants. This has important practical benefits as it minimizes dosing rate of the organic additive.

EXAMPLE 3

Comparison of Polyacrylic Acid and Activated Polyacrylamide in 12 hours Continuous Electrowinning The effectiveness of the method disclosed herein was compared to the method of U.S. Pat. No. 5,733,429 which uses 10 mg/L of PAA as the organic additive. For the purposes of comparison both APAM and PAA were dosed at the same concentration. It should be noted that the duration of the electrowinning was 12 hours in this example rather than the 4 hours used in the previous example. Table 3 summarises the results of this comparison.

TABLE 3

Comparison of PAA and APAM in 12 Hours Continuous EW

| Test No. | Polyacrylic Acid 84 | Activated PAM 85 |
|---|---|---|
| PAA/PAM Prep. Residence Time, Hrs | 2 | 2 |
| Concentration of PAA or PAM, mg/L | 10 | 10 |
| EW Time, Hrs | 12 | 12 |
| Current Density, mA/cm$^2$ | 30 | 30 |
| Electrolyte Temperature, °C. | 50 | 50 |
| RCE RPM | 10 | 10 |
| Dendrite | Numerous | None |
| Surface Roughness, Ra, μm | >20 | 10.5 ± 1. |

Table 3 shows that it was not possible to measure the surface roughness of the copper deposit produced by polyacrylic acid due to the presence of fine dendritic needles stopping the travel of the stylus tip. The copper deposit produced by PAA was rougher compared to the copper deposit produced using APAM. Tables 2 and 3 clearly show that APAM is more effective at eliminating dendrite formations than polyacrylic acid.

EXAMPLE 4

Ageing of Activated Polyacrylamide in 16-Fold Diluted Electrolyte and in Full-Strength Electrolye This test was undertaken to evaluate whether APAM needs to be prepared every 24, 12 or 6 hours at a commercial scale. Accordingly, the effect of hydrolysis in 16-fold diluted electrolyte at room temperature over a 24 hours period was studied.

In addition, it is necessary to determine the extent of deactivation of APAM that occurs once APAM is dosed into the electrowinning circuit. This was studied by undertaking an experiment (Test 3) in which electrowinning was undertaken in a solution after APAM was exposed to full strength electrolyte at 50° C. The data from these tests are shown in Table 4. FIG. 3 shows the error plot for this testwork.

TABLE 4

Effect of PAM Degradation in 16-fold Diluted Electrolyte and in Electrolyte

| Test No. | 1 | 2 | 3 |
|---|---|---|---|
| APAM pH Preparation Media | 1.5 | 1.5 | 1.5 |
| Preparation Temp., °C. | 50 | 25 | 50 |
| PAM Residence Time in 16-fold DE, Hrs | 2 | 24 | 24 |
| APAM Resd. Time in Electrolyte, Hrs | 0 | 0 | 24 |
| Sulphuric Acid Conc., g/L | 10 | 10 | 10 & 160 |
| APAM Conc., mg/L | 1 | 1 | 1 |
| EW Time, Hrs | 6 | 6 | 6 |
| Voltage Drop, V | 1.34 | 1.39 | 1.41 |
| Current Density, mA/cm$^2$ | 30 | 30 | 30 |
| Electrolyte Temp., °C. | 50 | 50 | 50 |
| RCE rpm | 10 | 10 | 10 |
| Surface Roughness, Ra μm | 6.23 | 6.89 | 7.46 |
| Ra Standard Dev., μm | 0.41 | 0.68 | 0.86 |
| Dendrites Formation | Nil | Nil | Nil |

Test 1 produced the lowest surface roughness with 2 hours prepared PAM in 16-fold diluted electrolyte followed by Test 2 with 24 hours residence time in 16-fold diluted electrolyte at 25° C. The electrolyte bath from Test 2 was maintained at 50° C. for 24 hours and then run Test 3 without adding any fresh APAM. The surface roughness produced from Test 3 was the highest which indicates that additional hydrolysis in the electrolyte at 50° C. for 24 hours after 24 hours degradation in 16-fold diluted electrolyte at 25° C. increased surface roughness. One-way ANOVA indicates that Tests 1 and 2 are not significantly different ($\alpha=0.15$) but Tests 1 and 3 do differ ($\alpha=0.004$). Therefore, subsequent hydrolysis of APAM as a result of the electrowinning process ("matter of course" hydrolysis) resulted in a less efficacious additive. This may reflect the formation of less adsorbent copolymers than freshly activated PAM or that the APAM further hydrolyses or decomposed to smaller molecular chains.

The results indicate that APAM can be prepared for 24 hours and kept in the dosing tank without losing its levelling efficacy. However, based on the data shown in FIG. 3, it may be desirable to prepare it every 6 or 12 hours and continuously dose.

EXAMPLE 5

Comparison of Guar and Activated Polyacrylamide in 12 hours Continuous Electrowinning The effectiveness of the method disclosed herein is compared with the publication of Vereecken and Winand (1976) in 12 hours EW time. One mg/L Guar was dosed at 0 (20 minutes before the EW cell was powered), 3, 6 and 9 hours giving a total cumulative concentration of 4 mg/L over 12 hours EW time. In Test 132 APAM was dosed only once at 0 hours and, in Test 133, APAM was dosed twice at 0 and 6 hours over 12 hours EW time. The results are shown in Table 5 and FIG. 4.

TABLE 5

Comparison of Guar and APAM in 12 Hours Continuous EW

| | ADDITIVE | | |
|---|---|---|---|
| | Guar | APAM | |
| RCE Test No. | 128 | 132 | 133 |
| PAM Prep. Residence Time, Hrs | 2 | 2 | 2 |
| Guar or PAM Preparation Media | water | 16-fold DE | 16-fold DE |
| Guar or PAM Preparation Temp., ° C. | 25 | 50 | 50 |
| Guar or APAM Initial Conc., mg/L | 1 | 1 | 1 |
| Guar or APAM Dosed, mg/L | 1 | 1 | 1 |
| Guar or APAM Dosing Frequency, Hrs | 3 | 0 | 6 |
| Guar or APAM Total Dosed, mg/L | 4 | 1 | 2 |
| RCE rpm | 10 | 10 | 10 |
| EW Time, Hrs | 12 | 12 | 12 |
| Current Density, Amp/m$^2$ | 300 | 300 | 300 |
| Electrolyte Temperature, ° C. | 50 | 50 | 50 |
| Surface Roughness, Ra, μm | Unmeasurable | 12.79 | 11.71 |
| Surface Roughness Std. Dev., μm | NA | 1.07 | 1.28 |
| Number of Dendrites > 0.05 mm | 12 | Nil | Nil |

The surface roughness of the copper deposit produced with Guar was not able to determine since the dendrites stopped the travel of the stylus. But the surface roughness with one and two mg/L of APAM over 12 hours is 12.79±1.07 and 11.71±1.28, respectively, and no dendrites were observed.

FIG. 4 shows the copper deposits produced with Guar (RCE 128) and with APAM (RCEs 132 and 133) and it can be seen the presence of dendrites from RCE 128 and the absence of dendrites from RCEs 132 and 133.

It is concluded that APAM even at one mg/L total concentration over 12 hours is a superior additive than the industry standard Guar at 4 mg/L total concentration over the same period. The results of this example are consistent with those reported in Example 4, above.

EXAMPLE 6

Experimental Design—Activated Polyacrylamide or Guar

Experimental test work was used to evaluate the ageing process of guar and APAM under similar conditions of temperature, current density and diffusion layer thickness. The experimental design included all four possible combinations of the presence and absence of Guar and APAM at concentrations of 1 mg/L. This concentration was selected as most electrowinning plants dose between 0.5 to 1 mg/L guar to the electrolyte. The EW time was also 6 hours. Guar and PAM were dosed only once at the beginning of each test and electrolyte temperature, current density and diffusion layer thickness were maintained constant at 50° C., 300 Amp/m$^2$ and 220 microns (10 rpm), respectively. PAM was prepared using 16-dilute electrolyte at 50° C. for 2 hours as normal. Guar was prepared in distilled water at 25° C. with agitation throughout this application as this is the typical preparation condition at commercial operations. Guar was dosed twice and APAM once and the electrolyte temperature, current density and rotational speed of the electrode were 50° C., 30 0Amp/m$^2$ (30 mA/cm$^2$) and 10 rpm (diffusion layer thickness, 220 μm), respectively. The results are shown in Table 6.

Table 6 shows that Run 1 (RCE 119), without additives, has the greatest unmeasurable surface roughness and numerous dendrites as is widely known from the literature. Table 6 also shows that Run 2 and its replicate (RCE 124 and 127) with Guar alone show that dendrite formation is uncontrolled as very numerous small dendrites (needles like) were observed.

It is also shown in Table 6 that Runs 3 and 4 (RCEs 125 and 126) no dendrites were observed and the surface roughness with APAM as the sole additive is lower than that with APAM and Guar combined. The presence of dendrites in this example preclude statistical analysis of the results since the presence of dendrites made the measurement of truly random parts of the surface impossible. Run 3 (RCE 125) will be used for further comparisons.

TABLE 6

2$^2$ Experimental Design Results APAM-or-Guar

| | | Factors, mg/L | | Surface Roughness, Ra, μm | | Observations |
|---|---|---|---|---|---|---|
| Run | RCE | APAM | Guar | Mean | Std. Dev | of Dendrites |
| 1 | 119 | 0 | 0 | 7.68 | 2.16 | Numerous |
| 2 | 124 | 0 | 1 | NA | NA | Very Numerous |
| 3 | 125 | 1 | 0 | 6.42 | 0.27 | None |
| 4 | 126 | 1 | 1 | 6.71 | 0.36 | None |
| 2R | 127 | 0 | 1 | NA | NA | Very Numerous |

The presence of Guar alone does not control dendrites (Tests 2, and 2R). The only tests that showed no dendrite formation were Tests 3 and 4 in which APAM was present. This demonstrates the efficacy of APAM in controlling dendrite formation.

The conclusion of Vereecken and Winand (1976) was the quality of the copper deposits obtained at 200 Amp/m$^2$ current density with guar gum was better than those obtained with PAM. However the above examples show that guar gum is less effective in the control of dendrite growth than APAM. It is likely that the difference in the concentration of sulphuric acid contributes to these differing results, with Vereecken utilising 50 g/L sulphuric acid which is likely to result in slower degradation of guar gum than that at 160 g/L and therefore its levelling effect lasts longer during the electrowinning process. Moreover, Vereecken and Winand (1976) reported that the polarization behaviour of the electrode remains constant in the absence and presence of PAM. The present invention suggests current densities up to 400 Amp/m$^2$ and demonstrates that the presence of APAM during the electrodeposition process causes polarization of the electrode as a typical levelling agent, such as discussed below in example 8.

EXAMPLE 7

Factorial Experimental Design—Effect of APAM and Guar on Surface Roughness

This experimental design was developed to characterize the effect of Guar and APAM on surface roughness in conditions, which simulated commercial plant conditions. A $2^{5-2}$ fractional factorial experimental test was conducted to evaluate the effect of Guar and PAM under conditions in which the variables temperature, current density (CD) and diffusion layer thickness as well as APAM and Guar were systematically varied. Guarfloc 66 was dosed twice during the EW test. The first dose was added at the beginning and the second one at half time of EW time, 2 hours 10 minutes or 2 hours 21 minutes, depending on the current density. The number of coulombs applied to each test was 14,000. APAM was prepared in 16-fold diluted electrolyte at 50° C. for 2 hours and dosed once at the beginning of the experiment. The experimental conditions are shown in Table 7.

TABLE 7

$2^{5-2}$ Fractional Factorial Experimental Design

| | Factors | Factor Level | |
|---|---|---|---|
| | | Low | High |
| A | T (Temperature, ° C.) | 45 | 65 |
| B | i (Current Density, Amp/m$^2$) | 280 | 320 |
| C | L (Guartec, mg/L) | 0.5 | 1 |
| D | (APAM, mg/L) | 0.5 | 1 |
| E | δ (Diffusion Layer Thickness, μm) | 87 | 110 |

Table 8 presents the results for this experimental design and a model to derive surface roughness with 95 percent confidence interval is:

$$\text{Surface Roughness, } \mu m = +6.16 - 0.089*B - 0.075*C - 0.41*D + 0.23*E - 0.17*B*C \quad [3]$$

The model adequacy was checked using residual analysis which is given by a normal probability plot of residuals (Studentized residuals), residuals and predicted plot, and Outlier T plot as suggested by Montgomery (*Design and Analysis of Experiments*. 5th ed: John Wiley & Sons; 2001) and Expert-Design software (Stat-Ease SME. Design-Expert Software. In: John Wiley & Sons, Inc; 2001.). No indication of abnormalities were observed for this experimental design.

It can be seen from Equation 3 that the surface roughness was strongly negatively correlated with APAM (D) concentration whereas the correlation with Guar (C) concentration had a much lower coefficient.

In summary, it has been demonstrated statistically in Example 7 APAM is a superior levelling agent than Guar. This result agrees with those presented in Example 6: Experimental Design—APAM or Guar. Therefore, Guar is a poor levelling agent, as it degrades faster than APAM in the temperature range of 45 to 65° C. deteriorating the uniformity of the surface roughness of the copper deposit but the mechanism of this process is not understood. APAM is therefore a superior additive than the industry standard Guar.

TABLE 8

$2^{5-2}$ Fractional Factorial Experimental Results

| Run | A Temp. ° C. | B C. D mA/cm$^2$ | C Guar mg/L | D APAM mg/L | E D Layer T μm | Response Surface Roughness, Ra, μm |
|---|---|---|---|---|---|---|
| 1 | 45 | 32 | 1.00 | 0.50 | 87 | 5.99 ± 0.66 |
| 2 | 65 | 28 | 1.00 | 0.50 | 110 | 6.86 ± 2.28 |
| 3 | 65 | 28 | 0.50 | 0.50 | 87 | 6.36 ± 0.64 |
| 4 | 45 | 28 | 0.50 | 1.00 | 110 | 5.95 ± 0.47 |
| 5 | 45 | 32 | 0.50 | 0.50 | 110 | 7.08 ± 1.38 |
| 6 | 65 | 32 | 1.00 | 1.00 | 110 | 5.66 ± 0.69 |
| 7 | 45 | 28 | 1.00 | 1.00 | 87 | 5.83 ± 0.72 |
| 8 | 65 | 32 | 0.50 | 1.00 | 87 | 5.56 ± 0.67 |

EXAMPLE 8

Polarization of Activated Polyacrylamide

Cyclic voltammetry (CV) was undertaken in APAM solutions (pre-activated in 16-fold diluted electrolyte at 50° C. for two hours) in full-strength electrolyte that varied in the duration of exposure of APAM to full-strength electrolyte between 0 and 7 hours. The CVs were conducted using a small rotating stainless steel cylindrical electrode that had copper electroplated at 10 mA/cm$^2$ for 225 seconds prior to the experiments. The CV experiments were carried out at two different temperatures: 45 and 65° C. This test is aimed at determining the effect of temperature on polarization behaviour of APAM on copper.

This was undertaken as it is known (JJ Kelly, Copper Deposition in the Presence of Mixed Surfactants, PhD Thesis, Columbia University, 1999 and references therein) that effective levelling polarizes the electrode during deposition.

The cell for all steady-state polarization studies was a 500 mL long-necked glass beaker with a specially prepared four-port lid. The counter electrode was prepared from dimensionally stable anode (DSA, ELTECH) in such a way that it surrounded the internal wall of the beaker. The working electrode (WE) was a 316L stainless steel cylinder with a 5.31 mm height and 12 mm diameter giving a working area of 2 cm$^2$. The working electrode was polished with one μm and 0.25 μm diamond paste (Struers), washed with distilled water and acetone, rinsed in the electrolyte solution and rinsed again with distilled water. It was pre-plated with copper at 10 mA/cm$^2$ for 225 seconds in the electrolyte of interest before each experiment in order to obtain reproducible results. Table 9 shows the experimental conditions.

TABLE 9

Experimental Conditions for CV and EIS Experiments

| | |
|---|---|
| Copper, g/L | 36 |
| Sulphuric acid, g/L | 160 |
| Chloride ions, mg/L | 25 |
| PAM Preparation Media | 16-fold DE |
| PAM Preparation Media Temperature, ° C. | 50 |
| Electrolyte Volume, mL | 500 |
| APAM Concentration in Electrolyte, mg/L | 2 |
| RCE rpm | 10 and 25 |
| Copper Pre-plating Time for CV and EIS, respectively, sec | 225 and 360 |
| Current Density during Pre-plating, mA/cm$^2$ | 10 |

TABLE 9-continued

Experimental Conditions for CV and EIS Experiments

| | |
|---|---|
| Electrolyte Temperature, ° C. | 45 and 65 |
| Sweep rate, mV/sec | 1 |
| Diffusion Layer Thickness for CV using RCE at 10 rpm, µm* | 90 (110) |
| Diffusion Layer Thickness for EIS using RCE at 25 rpm, µm* | 87 (99) |
| Outer Cylinder Diameter, cm | 7.5 |
| Inner (rotating) Cylinder Diameter, cm | 1.2 |
| WE (316L stainless steel) surface area for CV, $cm^2$ | 2 |
| WE (316L stainless steel) surface area for EIS, $cm^2$ | 1.5 |

*Diffusion layer thickness at 45° C. and 65° C. in brackets.

FIG. 5 shows the cyclic voltammetry graph on stainless steel and pre-plated copper at 45° C. where the depolarization behaviour of Guar can be observed. FIG. 6 shows the depolarization values for Guar extracted from FIG. 5 at 30 and 40 $mA/cm^2$.

FIG. 7 shows the cyclic voltammetry graph on stainless steel and pre-plated copper at 45° C. where the polarization behaviour of APAM can be observed. FIG. 8 shows the depolarization values for APAM extracted from FIG. 7 at 30 and 40 $mA/cm^2$.

FIG. 9 shows the cyclic voltammetry graph on stainless steel and pre-plated copper at 65° C. where the polarization behaviour of APAM can be observed. FIG. 10 shows the depolarization values for APAM extracted from FIG. 9 at 30 and 40 $mA/cm^2$.

FIG. 5 shows that Guar at 45° C. depolarizes the 316L stainless steel and copper metal electrodes. In contrast, FIG. 7 at 45° C. and FIG. 9 at 65° C. show that APAM polarizes the electrode. It can also be seen in FIG. 6 that the extent of depolarization of Guar is approximately constant over a period of several hours. Similarly, FIG. 8 at 45° C. and FIG. 10 at 65° C. indicate that the polarization behaviour of APAM continues for about 6-7 hours, but at 65° C. the polarization value appears to be returning to the polarization value without the presence of additives faster than that at 45° C.

These results are consistent with (1) APAM acting as a levelling agent and (2) it does so for extended periods of time, which is consistent with the results described in Examples 2 and 3—Comparison of PAA and APAM. This results contrasts with those of Vereecken and Winand (1976) who reported that PAM did not polarize the electrode. However, it is unclear from their paper how PAM was prepared, and therefore the apparent discrepancy may reflect different modes of preparation.

The maximum polarization at 45 and 65° C. is approximately 14 mV but the time to attain this maximum values is about 3.5 hours at 45° C. and 1.5 hours at 65° C. These results correlate with the fractional factorial experimental results in which it was demonstrated that APAM had a more significant effect on reducing surface roughness at 65° C. than at 45° C. As the electrolyte temperature in copper electrorefining is 65° C., it is probable that APAM can be an additive in copper electrorefining as well as in electrowinning.

EXAMPLE 9

Charge-Transfer Resistance and Double-Layer Capacitance of Activated Polyacrylamide Electrochemical Impedance Spectroscopy experimental results were simulated using the equivalent circuit most often referred to in the literature for electrochemical interfaces using the LEVM program (J., LEVM Manual—Complex Nonlinear Least Squares, Version 8.0, 2003, Macdonald, J. Impedance Spectroscopy Emphasizing Solid Materials and Systems, 1987). This equivalent circuit that consists only of resistors and capacitors is used to describe the two single-electron transfer steps. This selection appears to be valid for Langmuir isotherms and other similar isotherms, ie., Frumkin isotherm. This equivalent circuit was also used for copper deposition in the presence (Jovic V. et al., J. Serb. Chem. Soc., 2001, 66, 11-12, 935-952); and absence of organic additives (Nava de Oca et al. Chemical Engineering Science, 2001, 56, 8, 2695-2702).

Table 10 summarizes the maximum change of the charge-transfer resistance and double-layer capacitance inferred from EIS produced by Guar at 45° C. and APAM at 45° C. and 65° C. APAM increased the charge-transfer resistance throughout the testwork; in contrast, Guar reduced it. At 45° C., APAM reduced the double-layer capacitance more than Guar at 45° C. This reduction of the double-layer capacitance by APAM was increased when the temperature was increased from 45° C. to 65° C. These results indicate that APAM is more specifically adsorbed than Guar.

TABLE 10

Maximum change in Charge-Transfer Resistance and Double-Layer Capacitance relative to no additives due to the Presence of Guar and APAM

| Additive | EIS Conditions mV vs. MSE | Change in Charge-Transfer Resistance, ohm · $cm^2$ | Change in D-L Capacitance, $\times 10^{-5}$, $\mu F/cm^2$ | Res. Time in Elec., Hrs.* |
|---|---|---|---|---|
| Guar | −490 mV and 45° C. | −0.086 | −0.46 | 2-3 |
| APAM | −470 mV and 45° C. | +0.42 | −1.2 | 3-5 |
| APAM | −490 mV and 45° C. | +0.23 | −1.2 | 3-5 |
| APAM | −445 mV and 65° C. | +0.34 | −6.8 | 2 |

*Maximum change determined at this residence time.

The CV results at 45° C. are consistent with the EIS results at 45° C. in that Guar depolarizes the electrode or decreases the charge-transfer resistance. In other terms Guar increases the rate of growth rather than the rate of nucleation. In contrast, APAM polarized the electrode or increases the charge-transfer resistance, promotes nucleation rate rather than growth rate. These results for APAM were replicated at 65° C. Overall Cyclic Voltammetry and Electrochemical Impedance Spectroscopy results concur in terms that APAM (i) behaves as a true levelling agent and (ii) does so for extended periods of time.

EXAMPLE 10

Bench Scale Copper Electrowinning Tests

This test was aimed at investigating and comparing the effectiveness of Guarfloc 66 (Guar) and activated polyacrylamide (APAM) to control dendrite growth in a continuous copper electrowinning system using parallel plate electrodes instead of a rotating cylinder electrode and for longer EW times than previously reported. This comparison was carried out using the current-industry standard copper electrowinning operating conditions. But it should be noted that the 280-320 Amp/m² industrial-standard current density was increased to 340 Amp/m² and, Guar and APAM were also increased from about 175 grams/tonne copper cathode or 0.50 mg/L in the electrolyte as typical used in commercial operations to 200 grams/tonne or 0.68 mg/L.

Operating Conditions

The electrolyte was prepared using copper sulphate from Pronalys—Biolab AR and UNIVAR sulphuric acid AR. The net electrolyte volume in the EW cell was 3.9 L (without electrodes) and the flow rates of the re-circulating and advanced electrolyte were maintained constant at 31.5 and 7.9 mL/Min, respectively. Eighty percent of the total electrolyte flow rate was re-circulated to the EW cell using a Watson Marlow 505S peristaltic pump to simulate commercial operations. This recirculation maintains the activity of surface-active Guar or APAM constant in the EW cell and also possibly controls their ageing process. The organic additives were dosed constantly at 2.1 mL/hour using a syringe infusion pump. The concentration of the organic additive in the aliquot was 0.68 mg/mL. The electrolyte in the EW cell was stirred using a magnetic stirrer at 30 mA measured with a power meter. This low current induced a minimum agitation to improve the diffusion of the organic additive. The electrolyte temperature was kept at 50.5±0.5° C in a water bath. Table 11 and FIGS. 11 and 12 show the details of the operating conditions.

The cathode substrate was a 316L 2B finish stainless steel and the anodes were prepared from a lead alloy anode. Current industry-standard ABS edge strips were inserted on the stainless steel and the corners joined at 45° with Araldite K138 and hardener K138 Part B, an acid resistant and thermally stable epoxy resin. The stainless steel substrates (3 cathodes) were thoroughly washed with acetone and water, soaked in an electrolyte solution for 24 hours and washed again with distilled water. The anodes were washed, brushed and soaked in a different electrolyte solution for a week. The distance between the electrodes was 40 mm which is similar to the industry standard of copper electrowinning.

Guar was dissolved in water at room temperature, under stirring, for two hours and APAM in 16-fold diluted electrolyte at 50° C. also under stirring, also for two hours. FIG. 11 shows the EW cell design in detail and FIG. 12 shows the overall bench scale design.

TABLE 11

| Operating Conditions | |
|---|---|
| Current Density, Amp/m² | 340 |
| Voltage Drop, V | 2.15 |
| Electrowinning Time | 44 hours 35 Minutes |
| Deposition Area (85.5 × 103.5 mm), cm² | 88.5 |
| Copper Concentration, g/L | 34-36 |
| Sulphuric Acid Concentration, g/L | 160 |
| Chloride ions Concentration mg/L | 25 |
| Electrolyte Net Volume, L | 3.9 |
| Electrolyte Temperature, ° C. | 50.5 ± 0.5 |
| Guar or APAM, g/tonne Copper Cathode | 200 |
| Guar or APAM Conc. in Electrolyte, mg/L | 0.68 |
| Advanced Electrolyte, mL/Min | 31.5 |
| Recirculating Electrolyte, mL/Min | 7.9 |
| Syringe Pump - Dosing Guar or APAM, mL/Hour | 2.1 |
| Power to Stir Solution, (30 mA), Watts | 7-8 |

TABLE 11-continued

| Operating Conditions | |
|---|---|
| Copper Conc. in Advanced Electrolyte, g/L | 50 |
| Sulphuric Conc. in Advance Electrolyte, g/L | 142 |
| Chloride Conc. in Advance Electrolyte, mg/L | 30 |

Results

Three EW tests were conducted in the following sequence: 1. with nil additives for 10 hours; 2. Guar and 3. with APAM both for 44 hours 35 minutes. The copper deposits obtained from tests 1 and 2 showed the presence of dendrites all less than 1-2 mm in length. In contrast, the copper deposit from Test 3 where APAM was dosed showed no dendrites.

The physical appearance of copper deposit obtained with Guar was rougher than that obtained with APAM. Both sides of the deposit produced with Guar have a needle-like, granular appearance throughout the plate. But the deposit produced with APAM is smoother, brighter and more compact than the copper deposit produced with Guar. FIGS. 13 and 14 show the full plate from each side obtained using Guar. FIGS. 15 and 16 similarly show those plates for APAM. It can be also observed that the copper deposits obtained with Guar possess three areas where copper deposition has not taken place. The same result is very often found at commercial scale electrowinning operations but not at electrorefining operations where glue and thiourea are used.

Scanning Electron Miroscopy of Copper Cathode Cross-Sections

The cross-section of the copper cathodes produced in Example 10 and those produced in commercial scale electrowinning trials were examined using scanning Electron Microscopy.

FIGS. 17-23 show the scanning electron microscopy (SEM) micrographs of the cross-sectioned copper cathodes obtained from the bench and commercial scale trials. The test details of the commercial scale trials are presented in FIGS. 17-21. FIGS. 17-19 represent the cross sections when 0.2, 0.5 and 1.0 mg/L APAM were dosed as well as 0.6 mg/L Guar. The porosity in FIG. 17 with only 0.2 mg/L APAM is highly noticeable but it is not noticeable in FIGS. 18 and 19 when APAM was dosed at 0.5 and 1.0 mg/L, respectively.

FIGS. 20 and 21 show that the copper deposits are porous when Guar is dosed. FIGS. 22 and 23 report the cross sections obtained in Example 10. In the presence of Guar only, FIG. 22, the microstructure of the copper deposit appears to be more porous than any other deposit. It is therefore concluded that the porosity of the copper cathode is noticeable when Guar and low APAM concentration (0.2 mg/L) was dosed but it is not noticeable when at least 0.5 mg/L APAM was dosed. This porosity appears to be consistent with the reduction in the charge-transference resistance that Guar imparts during the deposition process described elsewhere.

It can be seen that all the cross sections show columnar growth excepting the Example 10 test with Guar. It can be seen that the width of the columns changes with the texture of the copper cathode. It can be noted that the commercial scale electrolyte for the comparison test (Guar only) may also contain some APAM due to the solution entrainment in the organic phase at the SX stage. Therefore the commercial scale results may not fully present the absence of APAM.

In metal deposition, nucleation is a very important process; the first step of metal deposition is the formation of nuclei of the depositing metal on a foreign substrate and on a substrate of the same metal. The competition between nucleation and growth determines the smoothness of the deposit: the higher the nucleation rate; the finer the crystal size. Moreover, the form of the growing crystals determine the physical appearance and structure: at a higher growth rate of the crystal size normal to the substrate, a more fibrous structure is obtained. A brightening effect can be achieved from large developed crystal faces parallel to the substrate (APAM). Therefore, the kinetics of nucleation and growth play a dominant role in determining the overall deposition kinetics, as well as the appearance, structure and properties of the deposit. The deposit in the presence of APAM is brighter than that from Guar and does have smaller crystallite size than Guar (higher nucleation rate, the finer the crystal size).

EXAMPLE 11

Crystallite Size Determination in the Presence of APAM

The competition between nucleation and growth determine the smoothness of the deposits: higher nucleation rates yield smaller crystallite sizes (Budevski e. et al. cited above). The effect of the ageing of APAM in the electrolyte was examined using the crystallite size of copper cathodes produced from laboratory scale tests using the RCE and bench scale tests using parallel plate electrodes where Guar or APAM where dosed continuously. In the bench scale tests, approximately 80% of the spent electrolyte was recycled and mixed with the advanced electrolyte to simulate a commercial EW plant.

The crystallite size of copper electrodeposits was determined by X-Ray powder diffraction analysis using a General Area Detector Diffraction Solution (GADDS) diffractometer. Crystallite size was calculated for copper thin films which were deposited on a 316 stainless steel RCE in the presence and absence of APAM. The crystallite size was calculated from a corrected full width at half maximum (FWHM) of the [110] peak profile using the Scherrer equation. Table 12 shows the diffractometer parameters, Table 13 shows the Kruskal-Wallis test results, and FIG. 24 shows the error box plot of the median of crystallite size.

The test of significant difference on crystallite size was calculated using Kruskal-Wallis method. It was found that in the absence of APAM the median crystallite size was 426 Å, which decreased to 364 Å in the presence of 0-4 hours degraded APAM (Test 2) and 398 Å up to 12 hours degraded APAM in the electrolyte (Test 3). As APAM further degraded (18-22 hours) the crystallite size increased to a size similar to that observed in the absence of APAM.

It has also been shown that degraded APAM (8-12 hours in the electrolyte) from the laboratory scale has 38% of crystallite size greater than 4500 Å and from bench scale EW tests shows 41% of crystallite size greater than 1800 Å. Moreover, the bench scale copper deposits also have a median crystallite size of 405 Å and 427 Å with APAM and Guar, respectively. As the median crystallite size with APAM is smaller than with Guar, there must be a larger number of smaller crystallites with APAM than Guar.

The rate of nucleation and growth play a dominant role in determining the overall deposition kinetics, as well as the appearance, structure and properties of the deposit. The copper deposit with APAM is brighter and does have greater amounts of smaller and larger crystallite sizes than those with Guar. It can therefore be inferred that the presence of APAM favours higher nucleation rates and greater 3D crystallite growth and coalescence than those in the presence of Guar. APAM possibly covers the active surface areas (peaks) and therefore deposition has to restart from less active areas (valleys) by forming new nucleates. The brightening effect of the copper deposit in the presence of APAM was probably achieved through large crystal faces that are parallel to the substrate.

These data are consistent with and confirm the surface roughness measurements in that fresh APAM produces the finest crystallites which would be expected to correlate with low surface roughness.

TABLE 12

| GADDS Diffractometer Parameters | |
|---|---|
| Radiation | Cu |
| Sample-detector distance | 30 cm |
| Collimator | 500 μm |
| kV, mA | 40, 52 |
| Data collection time/reading | 60 sec |
| 2θ, ω | 70, 30 |
| Step size, mm | 0.5 |
| Copper plate mapped area, cm$^2$ | ~2 |

TABLE 13

| Kruskal-Wallis Test Results for Crystallite Size Data | | | | |
|---|---|---|---|---|
| Test No. | 1 | 2 | 3 | 4 |
| Additive Qualitative Description | Nil | fresh | degraded | old |
| FWHM No. Readings, N | 1428 | 156 | 1479 | 1493 |
| Crystallite Size No. Processed, N | 1040 | 133 | 913 | 1102 |
| Crystallites percentage > 4500 Å, % | 27 | 15 | 38 | 26 |
| Crystallite Size Mean Rank | 1657 | 1333 | 1414 | 1716 |
| Asymptotic. Sig., Monte Carlo Sig., 99% CI | | $p = .0000$ | | |
| Median Crystallite Size, Å | 426 | 364 | 398 | 438 |

Copper Electrodeposition in the Presence of Partially Hydrolyzed Polyacrylamide (APAM)—Possible Mechanism 1. Polyacrylamide and hydrolysed polyacrylamide are surfactants used as flocculants and coagulants due to their adsorption properties. Hydrolysed polyacrylamide strongly adsorbs onto oxide surfaces.
2. One-way ANOVA between groups indicates that 'Activated polyacrylamide' (APAM) prepared in 16-fold diluted electrolyte at 50° C. and for 2 hours under stirring produced a statistically significant lower mean surface roughness than when either prepared in water or prepared in full-strength electrolyte. It may be interpreted, therefore, that this preparation of APAM has the highest adsorption (surface coverage) on the substrate copper metal and stainless steel of any other means of polyacrylamide preparation.
3. An increase in residence time in alkaline solution at pH 8.5, increases PAM hydrolysis and consequently increases the surface roughness of the copper cathode.
4. Based on these results and the literature, it is hypothesized that APAM consists of blocks of acrylic acid and acrylamide segments with larger average sequence length of carboxyl groups, eg., 14 than that obtained from alkaline hydrolysis, eg., 1.4. Thus the degree of hydrolysis can be approximately the same from both preparation media but the activity maybe different. In other words the active copolymer in APAM may follow the structure of:

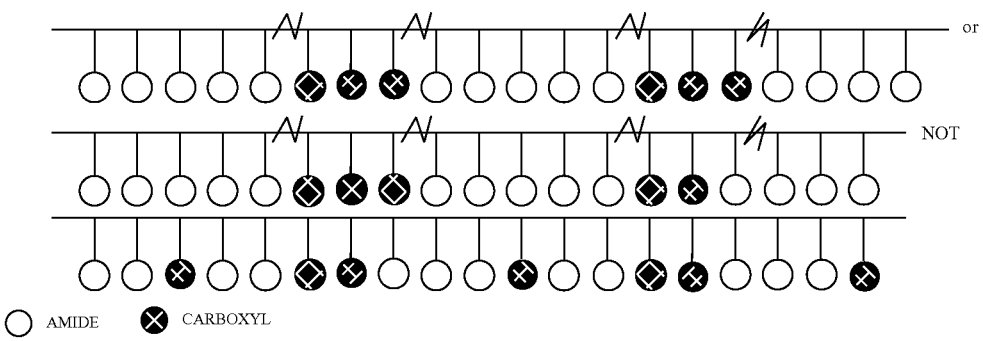

○ AMIDE  ⊗ CARBOXYL

5. Under more aggressive acid hydrolysis conditions than 16-fold diluted electrolyte, a greater than optimal conversion of PAM to other unknown subunits is proposed which results in less adsorption and consequently in an increased surface roughness.
6. It has been demonstrated that APAM is more thermally stable in typical electrowinning and electrorefining conditions than the industry standard for electrowinning, Guar.
7. It has been demonstrated that APAM produces lower surface roughnesses and/or lower dendrite densities than polyacrylic acid, un-degraded PAM or Guar.
8. In the presence of APAM the electrode remains polarized at 30 and 40 mA/cm² for several hours at 45° C. and 65° C. This result indicates that (1) the current efficiency of electrowinning and electrorefining plants can be improved and (2) the current density of contemporary plants can also be increased up to 400 Amp/m².
9. An additional benefit of the use APAM in copper electrorefining is that it can flocculate and coagulate the slimes since it is predominantly composed of kuperglimmer, (3Cu₂O.3.55NiO.Sb₂O₅) an oxide phase and other minor oxide phases (Cu—Sn or Sb—Ni).
10. It is proposed that activation of PAM to increase the number of carboxyl functional groups in the polymer chain results in a compound structure significantly different in chemical structure to polyacrylic acid as used in U.S. Pat. No. 5,733,429.
11. The CV results at 45° C. are consistent with the EIS results at 45° C. in that Guar depolarizes the electrode or decreases the charge-transfer resistance. In other terms Guar increases the rate of growth rather than the rate of nucleation. In contrast, APAM polarized the electrode or increases the charge-transfer resistance; promotes higher nucleation rates and lower growth rates compared with Guar. These results for APAM were replicated at 65° C. Overall Cyclic Voltammetry and Electrochemical Impedance Spectroscopy results concur in terms that APAM (i) behaves as a true levelling agent and (ii) does so for extended periods of time.
12. Electrochemical Impedance Spectroscopy results indicate that APAM is more specifically adsorbed at the electrode surface than Guar.

Whilst the method of electrowinning copper or electrorefining copper cathodes has been described with reference to a number of specific embodiments, it should be appreciated that it can be embodied in many other forms.

The invention claimed is:

1. A method of electrowinning or electrorefining copper from a copper electrolyte solution which contains chloride ions, the method comprising:
    forming a polyacrylamide solution by dissolving polyacrylamide, having a molecular weight range of 5,000 to 20,000,000 Daltons, in an acidic medium and under conditions to form a polyacrylamide block copolymer having blocks of carboxyl groups dispersed along the polymer backbone;
    introducing the polyacrylamide solution into an electrolytic cell containing the copper electrolyte solution at a polyacrylamide concentration of 0.01-10 mg/L; and
    electroplating copper from the copper electrolyte solution to form a copper cathode.

2. A method of electrowinning copper or electrorefining copper, the method comprising:
    forming an acidified ionic copper electrolyte solution which contains chloride ions and an additive, the additive being obtainable by dissolving polyacrylamide, having a molecular weight range of 5,000 to 20,000,000 Daltons, in an acidic medium and under conditions to form a polyacrylamide block copolymer having blocks of carboxyl groups dispersed along the polymer backbone, and electroplating copper from the ionic copper electrolyte solution to form a copper cathode.

3. A method as claimed in claim 2, wherein the ionic copper electrolyte solution further comprises thiourea, animal glue and/or a polysaccharide.

4. A method as claimed in claim 3, wherein the polysaccharide is guar gum.

5. A method as claimed in claim 2, wherein the electrolyte solution contains chloride ions at a concentration of 2-100 mg/L.

6. A method as claimed in claim 2, wherein the ionic copper electrolyte solution is acidified using sulphuric acid.

7. A method as claimed in claim 2, wherein the ionic copper electrolyte solution has a polyacrylamide concentration of 0.01-10 mg/L.

8. A method as claimed in claim 1, wherein the concentration of polyacrylamide dissolved in the acidic medium is 0.1-20 g/L.

9. A method as claimed in claim 1, wherein the pH of the acidic medium is 1.14-2.

10. A method as claimed in claim 1, wherein the acidic medium is selected from diluted ionic copper electrolyte solution, hydrochloric acid, phosphoric acid and sulphuric acid.

11. A method as claimed in claim 10, wherein the acidic medium is a diluted copper electrolyte solution.

12. A method as claimed in claim 1, wherein the polyacrylamide is dissolved in the acidic medium at a temperature in the range 50 to 90° C.

13. A method as claimed in claim 1, wherein the polyacrylamide is dissolved in the acidic medium over a period of 1 to 24 hours under stirring conditions.

14. Copper electroplated by a method as claimed in claim 1.

* * * * *